(12) United States Patent
Wang

(10) Patent No.: US 11,358,058 B2
(45) Date of Patent: Jun. 14, 2022

(54) INFORMATION OBJECT DISPLAY METHOD AND APPARATUS IN VIRTUAL SCENE, AND STORAGE MEDIUM

(71) Applicant: TENCENT TECHNOLOGY (SHENZHEN) COMPANY LIMITED, Shenzhen (CN)

(72) Inventor: Han Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 208 days.

(21) Appl. No.: 16/938,395

(22) Filed: Jul. 24, 2020

(65) Prior Publication Data

US 2020/0353355 A1 Nov. 12, 2020

Related U.S. Application Data

(63) Continuation of application No. PCT/CN2019/078859, filed on Mar. 20, 2019.

(30) Foreign Application Priority Data

Apr. 17, 2018 (CN) .......................... 201810345255.X

(51) Int. Cl.
*A63F 13/533* (2014.01)
*A63F 13/42* (2014.01)
(Continued)

(52) U.S. Cl.
CPC ............ *A63F 13/533* (2014.09); *A63F 13/42* (2014.09); *A63F 13/837* (2014.09);
(Continued)

(58) Field of Classification Search
CPC ...... A63F 13/53; A63F 13/533; A63F 13/837; A63F 2300/8076
See application file for complete search history.

(56) References Cited

U.S. PATENT DOCUMENTS

| 2007/0298866 | A1 | 12/2007 | Gaudiano et al. |
| 2011/0300910 | A1 | 12/2011 | Choi |
| 2017/0193705 | A1* | 7/2017 | Mullins .................. G06T 19/20 |

FOREIGN PATENT DOCUMENTS

| CN | 102046249 A | 5/2011 |
| CN | 103889524 A | 6/2014 |

(Continued)

OTHER PUBLICATIONS

Office Action and Search Report of Chinese patent application 201810345255.X, dated Aug. 12, 2021, 21 pages.

(Continued)

*Primary Examiner* — James S. McClellan
(74) *Attorney, Agent, or Firm* — Crowell & Moring LLP

(57) ABSTRACT

Embodiments of the present disclosure disclose a virtual item display method and apparatus in a virtual scene, and a storage medium. The method includes: controlling, by a terminal in response to a first target operation instruction generated by a first target operation, movement of a virtual control object in a virtual scene displayed by a client; displaying, by the terminal, a first target window in the virtual scene if a distance between the virtual control object and at least one first virtual item that can be picked up meets a target condition; closing, by the terminal in response to a second target operation instruction generated by a second target operation, the first target window in the virtual scene, and displaying a first target button in the virtual scene; and displaying, by the terminal, a second target button in the virtual scene if a distance between the virtual control object and at least one second virtual item that can be picked up meets the target condition. According to the embodiments of the present disclosure, a technical problem of low efficiency of displaying a virtual item in the related art is resolved.

20 Claims, 8 Drawing Sheets

(51) Int. Cl.
*A63F 13/837* (2014.01)
*G06F 3/0481* (2022.01)
(52) U.S. Cl.
CPC ...... *G06F 3/0481* (2013.01); *A63F 2300/308* (2013.01); *A63F 2300/6045* (2013.01); *A63F 2300/8076* (2013.01)

(56) References Cited

FOREIGN PATENT DOCUMENTS

| | | |
|---|---|---|
| CN | 104469423 A | 3/2015 |
| CN | 105159526 A | 12/2015 |
| CN | 106621329 A | 5/2017 |
| CN | 106779933 A | 5/2017 |
| CN | 107899246 A | 4/2018 |
| CN | 108815849 A | 11/2018 |

OTHER PUBLICATIONS

Hundred Gods Video: https://www.bilibili.com/video/av19359711, published Feb. 27, 2018.
Wilderness Operation video: https://3g.163.com/v/video/VFANRHCGI.html?referFrom= , published Feb. 9, 2018.
International Search Report and Written Opinion for PCT Patent Application No. PCT/CN2019/078859 dated Jun. 14, 2019 with Translation.

\* cited by examiner

INFORMATION OBJECT DISPLAY METHOD AND APPARATUS IN VIRTUAL SCENE, AND STORAGE MEDIUM

RELATED APPLICATION

This application is a continuation application of the International PCT Application No. PCT/CN2019/078859, filed with the Chinese Patent Office on Mar. 20, 2019 which claims priority to Chinese Patent Application No. 201810345255X, entitled "ITEM DISPLAY METHOD AND APPARATUS IN VIRTUAL SCENE, AND STORAGE MEDIUM" and filed with the Chinese Patent Office on Apr. 17, 2018, which are incorporated herein by reference in their entireties.

FIELD OF THE TECHNOLOGY

Embodiments of the present disclosure relate to the field of computers, and in particular, to a method and apparatus in a virtual scene, and a storage medium for displaying information objects in a virtual scene.

BACKGROUND OF THE DISCLOSURE

At present, a target window used for displaying identifiers of a plurality of items (or information objects) in a virtual scene. The target window cannot be removed once being triggered to be displayed, and other target windows in the virtual scene will also be displayed immediately once a target condition for triggering display is met. In this way, the visual field of a gamer in the virtual scene will be occupied all the time, reducing efficiency of displaying items and impacting user experience.

In addition, the target window cannot be dragged and scrolled in the virtual scene thus limiting the quantity of the identifiers of items that may be displayed, which reduces the efficiency of displaying items, causing inconvenience for controlling a virtual control object corresponding to the gamer to obtain an item.

For the problem of low efficiency of displaying the items, no effective solution has been provided yet.

SUMMARY

Embodiments of the present disclosure provide a method and apparatus, and a storage medium for displaying items in a virtual scene, to resolve at least the technical problem of low efficiency of displaying items in the related art.

According to an aspect of the embodiments of the present disclosure, an item display method in a virtual scene is provided. The method includes: controlling, by a terminal in response to a first target operation instruction generated by a first target operation, movement of a virtual control object in a virtual scene displayed by a client; displaying, by the terminal, a first target window in the virtual scene if a distance between the virtual control object and the at least one first virtual item that can be picked up meets a target condition, the first target window being configured to display at least one identifier each associated with one of the at least one first virtual item; closing, by the terminal in response to a second target operation instruction generated by a second target operation, the first target window in the virtual scene, and displaying a first target button in the virtual scene; and displaying, by the terminal, a second target button in the virtual scene if a distance between the virtual control object and at least one second virtual item that can be picked up meets the target condition.

According to another aspect of the embodiments of the present disclosure, an item display method in a virtual scene is further provided. The method includes: controlling, by a terminal in response to a first target operation instruction generated by a first target operation, movement of a virtual control object in a virtual scene displayed by a client; displaying, by the terminal, a first target window in the virtual scene if a distance between the virtual control object and the at least one first virtual item that can be picked up meets a target condition, the first target window being configured to display at least one identifier each associated with one of the at least one first virtual item; and switching, by the terminal, identifiers displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

In any of the methods above, playing, by the terminal, the first target window in the virtual scene if a distance between the virtual control object and the at least one first virtual item that can be picked up meets the target condition may include: displaying, by the terminal, the first target window in the virtual scene if the distance between the virtual control object and the at least one first virtual item that can be picked up is less than or equal to a target threshold; and displaying, by the terminal, a second target button in the virtual scene if a distance between the virtual control object and at least one second virtual item that can be picked up meets the target condition may include: displaying, by the terminal, the second target button in the virtual scene if the distance between the virtual control object and the at least one second virtual item that can be picked up is less than or equal to the target threshold.

In any one of the methods above, controlling, by a terminal in response to a first target operation instruction generated by a first target operation, movement of a virtual control object in a virtual scene displayed by a client may include: controlling, by the terminal in response to the first target operation instruction generated by the first target operation, movement of virtual attack equipment in a virtual scene displayed by a shooting game client, the client comprising the shooting game client, and the virtual control object comprising the virtual attack equipment; displaying, by the terminal, the first target window in the virtual scene if a distance between the virtual control object and the at least one first virtual item that can be picked up meets the target condition may include displaying, by the terminal, the first target window in the virtual scene if a distance between the virtual attack equipment and first virtual attack accessory equipment that can be picked up meets the target condition, the at least one first virtual item comprising the first virtual attack accessory equipment, and the first target window being configured to display an identifier of the first virtual attack accessory equipment; and switching, by the terminal, identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected may include: switching, by the terminal, an identifier of virtual attack equipment displayed in the first target window from an identifier of virtual attack accessory equipment in a first virtual attack accessory equipment set to an identifier of virtual attack accessory equipment in a second virtual attack accessory equipment set if a quantity of identifiers of the first virtual attack accessory equipment exceeds a total quantity of identifiers that are of the virtual attack accessory equipment and that are allowed to be displayed in a display area of the first target window, and the second target operation performed on the first target window is detected, the identifiers of the first virtual attack accessory equipment comprising the identifier of the virtual attack accessory equipment in the first virtual attack accessory equipment set and the identifier of the virtual attack accessory equipment in the second virtual attack accessory equipment set, and the identifier of the virtual attack accessory equipment in the first virtual attack accessory equipment set and the identifier of the virtual attack accessory equipment in the second virtual attack accessory equipment set being partially identical or completely different.

According to another aspect of the embodiments of the present disclosure, an item display apparatus in a virtual scene is further provided. The apparatus includes one or more processors and one or more memories storing a program unit, the program unit being executed by the processor and including: a first processing unit configured to cause a terminal to control, in response to a first target operation instruction generated by a first target operation, movement of a virtual control object in a virtual scene displayed by a client; a first display unit configured to cause the terminal to display a first target window in the virtual scene if a distance between the virtual control object and the at least one first virtual item that can be picked up meets a target condition, the first target window being configured to display at least one identifier each associated with one of the at least one first virtual item; a second processing unit configured to cause the terminal to close, in response to a second target operation instruction generated by a second target operation, the first target window in the virtual scene, and display a first target button in the virtual scene; and a second display unit configured to cause the terminal to display a second target button in the virtual scene if a distance between the virtual control object and at least one second virtual item that can be picked up meets the target condition.

According to another aspect of the embodiments of the present disclosure, an item display apparatus in a virtual scene is further provided. The apparatus includes one or more processors and one or more memories storing a program unit, the program unit being executed by the processor and including: a processing unit configured to cause a terminal to control, in response to a first target operation instruction generated by a first target operation, movement of a virtual control object in a virtual scene displayed by a client; a display unit configured to cause the terminal to display a first target window in the virtual scene if a distance between the virtual control object and the at least one first virtual item that can be picked up meets a target condition, the first target window being configured to display at least one identifier each associated with one of the at least one first virtual item; and an adjustment unit configured to cause the terminal to switch identifier of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

According to another aspect of the embodiments of the present disclosure, a storage medium is further provided. The storage medium stores a computer program, the computer program, when being run, being configured to perform the item display method in a virtual scene according to the embodiments of the present disclosure.

According to another aspect of the embodiments of the present disclosure, an electronic device is further provided. The electronic device includes a memory and a processor, the memory storing a computer program, and the processor being configured to run the computer program to perform the item display method in a virtual scene according to the embodiments of the present disclosure.

In the embodiments of the present disclosure, the method includes: controlling, by a terminal in response to a first target operation instruction generated by a first target operation, movement of a virtual control object in a virtual scene displayed by a client; displaying, by the terminal, a first target window in the virtual scene if a distance between the virtual control object and at the least one first virtual item that can be picked up meets a target condition, the first target window being configured to display at least one identifier each associated with one of the at least one first virtual item; and closing, by the terminal in response to a second target operation instruction generated by a second target operation, the first target window in the virtual scene, and displaying a first target button in the virtual scene; and displaying, by the terminal, a second target button in the virtual scene if a distance between the virtual control object and at least one second virtual item that can be picked up meets the target condition. The first target window is closed in the virtual scene, and the first target button is displayed in the virtual scene, thereby avoiding a scenario that the first target window cannot be removed from being displayed. When the distance between the virtual control object and the at least one second virtual item that can be picked up meets the target condition, the terminal displays the second target button in the virtual scene, so that the state of the target window being closed in the virtual scene is inherited and remains in effect, preventing the target window from occupying the visual field of a gamer in the virtual scene as a result of other target windows corresponding to other first virtual item in the virtual scene being displayed immediately after meeting the target condition for triggering display, thereby achieving the technical effect of improving the efficiency of displaying the items, and further resolving the technical problem of low efficiency of displaying the items in the related art.

BRIEF DESCRIPTION OF THE DRAWINGS

Accompanying drawings described herein are used to provide further understanding about the embodiments of the present disclosure, and constitute one portion of the present disclosure; and schematic embodiments of the present disclosure and their description are used to explain the present disclosure, and do not constitute an inappropriate limit on the present disclosure. In the accompanying drawings. The term "item" below refers to any information object.

DESCRIPTION OF EMBODIMENTS

To make a person skilled in the art better understand solutions of the present disclosure, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between similar objects but do not necessarily indicate a specific order or sequence. It is to be understood that data used in this way is exchangeable in a proper case, so that the embodiments of the present disclosure described herein can be implemented in another order except those shown or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

According to an aspect of the embodiments of the present disclosure, an embodiment of an item display method in a virtual scene is provided.

Figure 1:
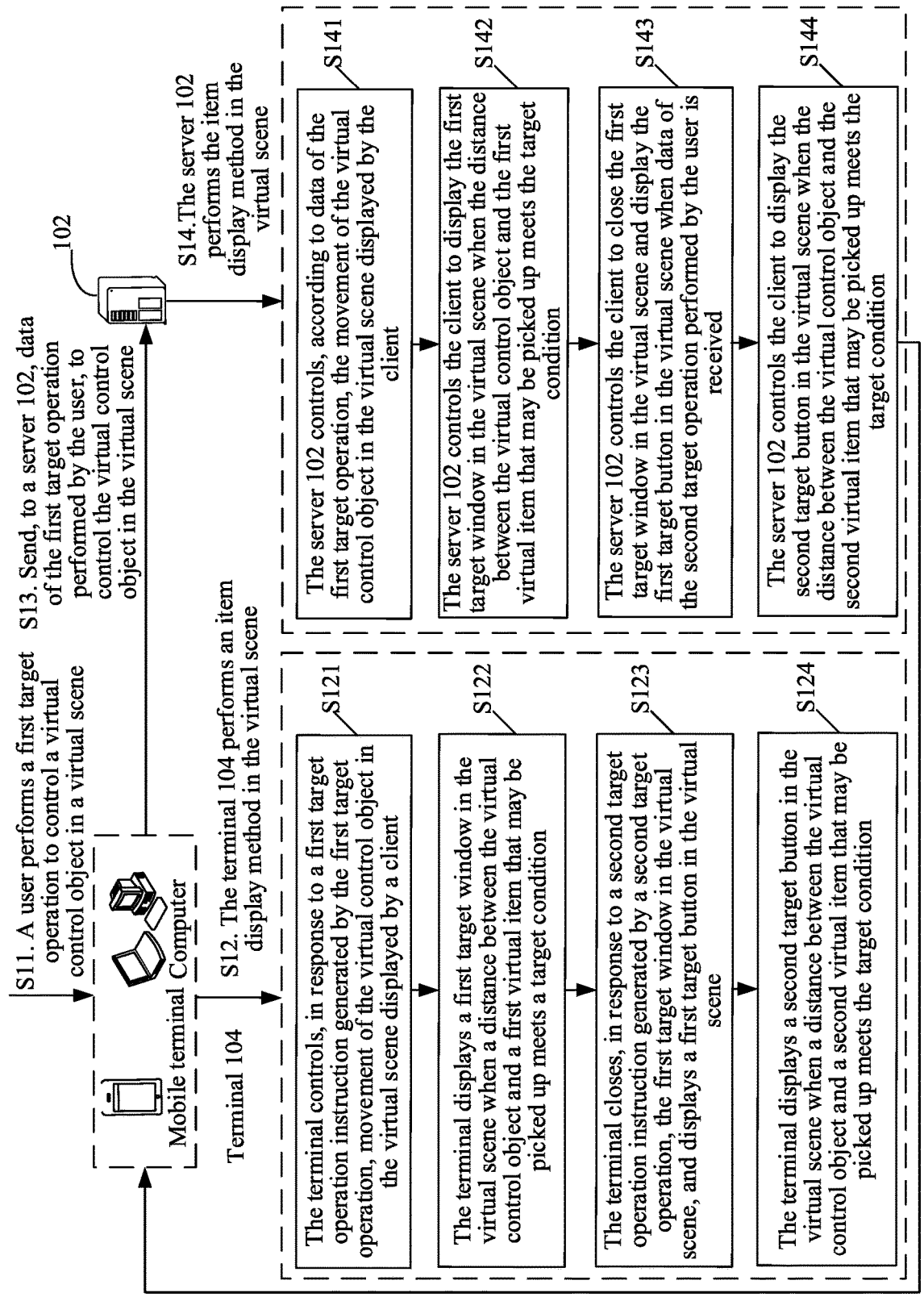
FIG. 1 is a schematic diagram of a hardware environment of an item display method in a virtual scene according to an embodiment of the present disclosure.

Optionally, in this embodiment, the item display method in a virtual scene may be applied to a hardware environment composed of a server 102 and a terminal 104 as shown in FIG. 1. FIG. 1 is a schematic diagram of a hardware environment of an item display method in a virtual scene according to an embodiment of the present disclosure. As shown in FIG. 1, the server 102 is connected to the terminal 104 by using a network. The network includes but is not limited to: a wide area network, a metropolitan area network, or a local area network, and the terminal 104 is not limited to a PC, a mobile phone, a tablet computer, and the like. The item display method in a virtual scene in this embodiment of the present disclosure may be performed by the server 102, or may be performed by the terminal 104, or may be jointly performed by the server 102 and the terminal 104. The item display method in a virtual scene of this embodiment of the present disclosure may also be performed by a client installed on the terminal 104.

The object processing method of this embodiment may be applied to at least one shooting game, for example, a first-person shooting game (FPS for short) or a third-person shooting game (TPS for short), the hardware environment may relate to the following steps:

Step S11: A user performs a first target operation to control a virtual control object in a virtual scene.

Step S12: A terminal 104 performs an item display method in a virtual scene.

Step S121: The terminal controls, in response to a first target operation instruction generated by the first target operation, movement of a virtual control object in a virtual scene displayed by a client.

Step S122: The terminal displays a first target window in the virtual scene if a distance between the virtual control object and the at least one first virtual item that can be picked up meets a target condition.

The first target window is used for displaying identifiers of the at least one first virtual item.

Step S123: The terminal closes the first target window in the virtual scene in response to a second target operation instruction generated by a second target operation, and displays a first target button in the virtual scene.

Step S124: The terminal displays a second target button in the virtual scene if a distance between the virtual control object and at least one second virtual item that can be picked up meets the target condition.

Step S13: Send data of the first target operation performed by the user to a server 102 to control the virtual control object in the virtual scene.

Step S14: The server 102 performs the item display method in a virtual scene.

Step S141: The server 102 controls, according to the data of the first target operation, movement of the virtual control object in the virtual scene displayed by the client.

Step S142: The server 102 controls the client to display the first target window in the virtual scene if the distance between the virtual control object and the at least one first virtual item that can be picked up meets the target condition.

The first target window is used for displaying the identifiers of the at least one first virtual item.

Step S143: The server 102 controls the client to close the first target window in the virtual scene when receiving data of the second target operation performed by the user, and controls the client to display the first target button in the virtual scene.

Step S144: The server 102 controls the client to display the second target button in the virtual scene if the distance between the virtual control object and the at least one second virtual item that can be picked up meets the target condition.

The foregoing steps S11 to S12, or steps S11, S13, and step S14 include a complete implementation process of the technical solution of this application. The technical solution of this application mainly relates to step S12 or step S14. The technical solution of step S12 is described in detail below with reference to a specific embodiment, and the solution of this embodiment is exemplarily applied to a shooting game.

Figure 2:
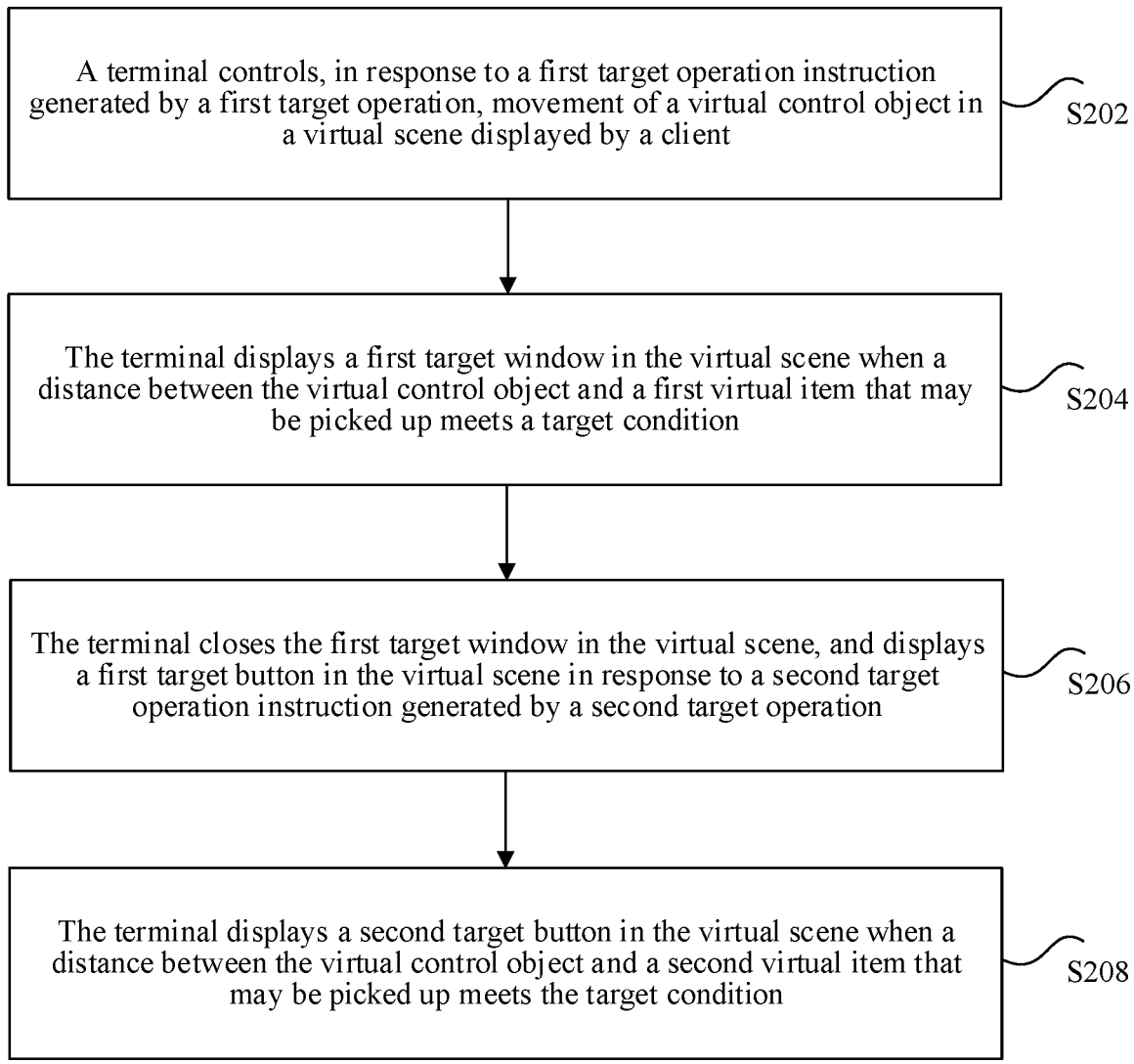
FIG. 2 is a flowchart of an item display method in a virtual scene according to an embodiment of the present disclosure.

FIG. 2 is a flowchart of an item display method in a virtual scene according to an embodiment of the present disclosure. As shown in FIG. 2, the method may include the following steps:

Step S202: A terminal controls, in response to a first target operation instruction generated by a first target operation, movement of a virtual control object in a virtual scene displayed by a client.

In the technical solution provided in step S202 of this application, the term "client" in this disclosure is used to refer to client application, or client software, for example, a game application. The client may be a shooting game client, for example, an FPS client or a TPS client. The virtual scene may be a game scene with a tight rhythm, a complex battle scene with high computing performance requirement. For example, the game scene may be an FPS scene or a TPS scene. The virtual control object may be virtual attack equipment such as a virtual gun and a pan controlled by a gamer in the virtual scene. The first target operation may be an operation that is of controlling the movement of the virtual control object in the virtual scene and that is performed by the gamer on the client during the operation of the client, the first operation instruction generated by the first operation is, a user instruction, to control movement of the virtual control object in the virtual scene displayed by the client.

The first target operation of this embodiment generates the first target operation instruction, thereby controlling, in response to the first target operation instruction, movement of the virtual control object in the virtual scene displayed by the client.

Step S204: The terminal displays a first target window in the virtual scene if a distance between the virtual control object and the at least one first virtual item that can be picked up meets a target condition.

In the technical solution provided in step S204 of this application, the first target window is used for displaying at least one identifier each associated with one of the at least one first virtual item.

In this embodiment, after controlling, in response to the first target operation instruction generated by the first target operation, the movement of the virtual control object in the virtual scene displayed by the client, the terminal may detect whether the distance between the virtual control object and the at least one first virtual item that can be picked up meets the target condition, for example, detect whether the distance between the virtual control object in the virtual scene displayed by the client and the at least one first virtual item that can be picked up is less than or equal to a target threshold. If the distance between the virtual control object and the at least one first virtual item that can be picked up is detected to be less than or equal to the target threshold, it is determined that the distance between the virtual control object and the at least one first virtual item that can be picked up meets the target condition. When it is detected whether the distance between the virtual control object and the at least one first virtual item that can be picked up meets the target condition, the virtual control object may stop moving in the virtual scene, or may be moving.

According to this embodiment, it may be detected whether the distance between the virtual control object in the virtual scene displayed by the client and the at least one first virtual item that can be picked up in a first item area in the virtual scene is less than or equal to the target threshold. The at least one first virtual item may include a plurality of target items that can be picked up in the first item area. Optionally, each target item is virtual attack accessory equipment equipped on the virtual attack equipment in a virtual scene. For example, the target item is different types of virtual attack accessory equipment such as medicines, magnifying mirrors, bullets, and body armor, which may be used for configuring the virtual attack equipment in the virtual scene.

After it is detected that the distance between the virtual control object in the virtual scene displayed by the client and the at least one first virtual item that can be picked up meets the target condition, the first target window is displayed in the virtual scene. The first target window, that is, an item display window, or an item box, or a floating box in the virtual scene and the like, may be displayed at a specific location in the virtual scene in a semi-transparent display mode, for example, displayed at the right side of the virtual scene, at the lower right corner of the virtual scene, and the like in a semi-transparent display mode, so not to interfere with observation of a battlefield situation in the virtual scene. The at least one identifier each associated with the at least one first virtual item is displayed in the first target window of this embodiment. The at least one identifier is also the identifier of a plurality of target items included in the at least one first virtual item. The at least one identifier may be used for indicating the situation of each target item in the at least one first virtual item in the virtual scene, including information such as a name, an icon, a number, and the like. No limitation is imposed herein.

Optionally, the identifier of each target item in the at least one first virtual item of this embodiment may be displayed in the first target window in a vertical display manner, or may be displayed in the first target window in a vertical display manner in accordance with a priority order in which each target item is used by the virtual control object. For example, the more value the target item to the virtual control object, the higher priority the target item has.

Step S206: The terminal closes the first target window in the virtual scene in response to a second target operation instruction generated by a second target operation, and displays a first target button in the virtual scene.

In the technical solution provided in step S206 of this application, in this embodiment, the second target operation is used for generating a second target operation instruction as a trigger to close the first target window in the virtual scene by the terminal. The second target operation may be a tap operation performed on the terminal, for example, a tap operation performed on the terminal, a double-tap operation, or the like. Optionally, when a second target operation performed on a close icon on the first target window is detected on the client, the first target window is closed in the virtual scene. The close icon may be an icon used for instructing to close the first target window, for example, a "x" icon, which may be located at any location on the first target window to facilitate the operation of the gamer, for example, located at a location such as the upper right corner of the first target window, the upper left corner, or the like. No limitation is imposed herein. After the first target window is closed in the virtual scene, the gamer will not see the first target window in the virtual scene, and further will not see any item identifiers, which avoids occupying the visual field range of the gamer in the virtual scene as a result of the first target window being displayed in the virtual scene all the time, thereby improving user experience.

The second target operation of a tap operation or a double-tap operation is merely an exemplary implementation of this embodiment of the present disclosure. Any operation that may be used for the terminal to trigger the closing of the first target window in the virtual scene is within the scope of this embodiment of the present disclosure, which is not described one by one by using an example herein.

In this embodiment, when the terminal closes the first target window in the virtual scene, the first target button is displayed in the virtual scene instead. The first target button may be an expansion button that is indicated by using an expansion icon, which is used for indicating that the first target window has been closed, and the first target window may be displayed in the virtual scene again by performing an operation on the first target button. Optionally, an area displayed by the first target window in the virtual scene contains an area displayed by the first target button in the virtual scene. The first target button does not block visual field of a gamer in the virtual scene, which greatly improves the visual field of the gamer in the virtual scene, and improves experience of the gamer.

Step S208: The terminal displays a second target button in the virtual scene if a distance between the virtual control object and at least one second virtual item that can be picked up meets the target condition.

In the technical solution provided in step S208 of this application, the state of the first target window is closed in the virtual scene will be inherited and followed by the subsequent target windows in other item areas in the virtual scene. In other words, after the terminal closes the first target window in the virtual scene, the subsequent target windows in other item areas in the virtual scene are also closed. The virtual scene of this embodiment may include a second item area different from the first item area. And item area contains at least one virtual item such first virtual item. If the terminal displays the first target button in the virtual scene, and it is detected on the client that a distance between the virtual control object and the at least one second virtual item that may be picked up in the second item area is less than or equal to the target threshold, the terminal displays a second target button in the virtual scene. The second target button may be an expansion button (which may have the same style as the first target button) that is indicated by using an expansion icon and that is of a second target window, and the second target window is not directly displayed. In other words, after the first target window is closed in the virtual scene, and the first target button is displayed, even if the distance between the virtual control object and the at least one second virtual item that may be picked up meets the target condition, the second target window is not triggered to be displayed in the virtual scene, instead only the second target button is displayed, which prevents the target window from occupying the visual field of the gamer in the virtual scene.

Optionally, after the terminal displays the first target window in the virtual scene, if the terminal does not close the first target window and display the first target button, then the terminal directly displays the second target window in the virtual scene when the distance between the virtual control object and the at least one second virtual item that can be picked up meets the target condition.

The terminal of this embodiment may control the virtual control object to move in the virtual scene according to a user instruction. When the virtual control object approaches the at least one first virtual item, a first target window is displayed, and an identifier of the at least one first virtual item is displayed in the first target window. When detecting that the user performs a closing operation on the first target window, the terminal closes the first target window and displays the first target button. When detecting that the user operates the first target button, the terminal displays the first target window again. After the terminal closes the first target window and displays the first target button, the terminal displays the second target button when detecting that the virtual control object approaches the second virtual item, and displays the second target window when detecting that the user operates the second target button. The at least one identifier each associated with the at least one second virtual item is displayed in the second target window, avoiding a case that the first target window cannot be removed from being displayed in the virtual scene, and preventing the target window from occupying the visual field of a gamer in the virtual scene as a result of other target windows in the virtual scene being displayed immediately after meeting the target condition for triggering display, thereby improving the efficiency of displaying the items.

Through step S202 to step S208, the first target window is closed in the virtual scene, and the second target button is displayed in the virtual scene, thereby avoiding a case that the first target window cannot be removed from being displayed. When the distance between the virtual control object and the at least one second virtual item that can be picked up meets the target condition, the terminal displays the second target button in the virtual scene, so that the state of the target window being closed in the virtual scene is inherited and remains, preventing the target window from occupying the visual field of a gamer in the virtual scene, thereby achieving the technical effect of improving the efficiency of displaying the items, and further resolving the technical problem of low efficiency of displaying the items in the related art.

In an optional implementation, after step S206 in which the terminal displays the first target button in the virtual scene, the method further includes: displaying the first target window again in the virtual scene if a third target operation performed on the first target button is detected.

After the terminal closes the first target window in the virtual scene in response to the second target operation instruction generated by the second target operation, and displays the first target button in the virtual scene, when the third target operation performed on the first target button is detected on the client, the terminal displays the first target window again in the virtual scene. In other words, when the third target operation performed on the first target button is detected on the client, the terminal calls out the closed first target window again in the virtual scene for display, thereby facilitating the operation performed on the first target window again by the gamer. The third target operation may be a tap operation, for example, a tap operation, a double-tap operation, or the like.

Optionally, in this embodiment, the state in which the terminal displays the first target window in the virtual scene will be followed by target windows in the other item areas in the virtual scene. After the terminal displays the first target window again in the virtual scene, when the distance between the virtual control object and the at least one second virtual item that can be picked up meets the target condition, the terminal displays the second target window in the virtual scene, and the identifier each associated with one of the at least one second virtual item is displayed in the second target window.

In an optional implementation, after step S208 in which the terminal displays the second target button in the virtual scene, the method further includes: displaying, by the terminal, a second target window in the virtual scene if a third target operation performed on the second target button is detected, the second target window being configured to display the identifier each associated with one of the at least one second virtual item.

In this embodiment, the second target window and the first target window may be different windows in the virtual scene, each including identifiers of different target items, but the second target window may have the same style as the first target window. The second target window of this embodiment is used for displaying the identifier each associated with the one of the at least one second virtual item that can be picked up. The at least one second virtual item that can be picked up may include a plurality of target items in a second item area, and a distance between each target item and the virtual control object meets the target condition.

After the terminal displays the second target button in the virtual scene, the second target window is displayed in the virtual scene if the third target operation performed on the second target button is detected on the client. For example, a tap operation is performed on the expansion button of the second target window, and then the second target window may be displayed in the virtual scene, so that the user can view the identifier each associated with one of the target items displayed in the second target window and select the required target item.

The third target operation is a tap operation and a double-tap operation, which is merely an exemplary implementation of this embodiment of the present disclosure. Any operation that may be used on the terminal to trigger the first target window and/or the second target window again to be displayed in the virtual scene is within the scope of this embodiment of the present disclosure, which is not described one by one by using an example herein.

In an optional implementation, after step S204 in which the terminal displays the first target window in the virtual scene, the method further includes: switching, by the terminal, identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a fourth target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

In this embodiment, the first target window displayed by the terminal in the virtual scene is a scrollable window, where the plurality of target items of the displayed at least one first virtual item may be flexibly adjusted through the fourth target operation to view more target items existing in the first item area. The fourth target operation of this embodiment may be a sliding operation performed on the first target window. For example, the sliding operation is an operation of sliding upward performed on a virtual sliding button on the first target window, so that the content of the first target window can be dragged and pulled up, or the sliding operation is an operation of sliding downward, so that the content of the first target window can be dragged and pulled down.

The at least one first virtual item of this embodiment includes a plurality of target items, and the first item set in the at least one first virtual item is displayed in the display area of the first target window. For example, the plurality of target items included in the at least one first virtual item are medicines, telescopes, bullets, body armor, and the like, the first item set includes medicines, telescopes, and bullets, and these items are displayed in the display area of the first target window. When a quantity of identifiers of the at least one first virtual item exceeds a total quantity of identifiers of items allowed to be displayed in the display area of the first target window, that is, when a quantity of identifiers of a plurality of target items included in the at least one first virtual item exceeds the total quantity of identifiers of items allowed to be displayed in the display area of the first target window, for example, when a quantity of identifiers of medicines, scopes, bullets, body armor, and the like included in the at least one first virtual item exceeds, by 3, than the total quantity of identifiers of items allowed to be displayed in the display area of the first target window, the first target window may be used for receiving the fourth target operation.

When detecting the fourth target operation on the first target window on the client, the terminal switches the identifiers displayed in the first target window from identifiers of items in the first item set to identifiers of items in the second item set. In addition to the identifiers of the items in the first item set, the identifiers of the at least one first virtual item of this embodiment further includes the identifiers of the items in the second item set. The identifiers of the items in the second item set are displayed in the first target window when a user performs the fourth target operation on the first target window. Distances between each item in the second item set and the virtual control object meet the target condition, and with the fourth target operation performed on the first target window, the identifiers of the items in the first item set may be partially the same as or completely different from the identifiers of the items in the second item set. For example, the plurality of target items included in the at least one first virtual item are medicines, scopes, bullets, body armor, and the like. The first item set includes medicines, scopes, and bullets, and the second item set includes scopes, bullets, body armor. The identifiers of the scope and the bullets in the first item set are the same as that of the scopes and the bullets in the second item set, so that the gamer can flexibly view and further select more target items as needed, thereby avoiding a problem that items displayed by a window in the virtual scene are fixed and cannot be flexibly adjusted for viewing and selecting more items, and further improving the efficiency of processing the items.

The fourth target operation is merely an exemplary implementation of the embodiments of the present disclosure as an operation of sliding upward or downward. Any operation that may be used for triggering adjustment of the identifier of the item displayed in the first target window from the identifiers of the items in the first item set to the identifiers of the items of the second item set to facilitate viewing of more target items in the first item area by the gamer is within the scope of this embodiment of the present disclosure, which is not described one by one by using an example herein.

In an optional implementation, after step S206 in which the terminal displays the first target button in the virtual scene, the method further includes: removing, by the terminal, the first target button from being displayed in the virtual scene if a distance between the virtual control object and the at least one first virtual item that can be picked up does not meet the target condition.

In this embodiment, the terminal controls, in response to the first target operation instruction generated by the first target operation, the virtual object moves and the distance between the virtual control object and the at least one first virtual item may change. After the first target window is closed in the virtual scene and the terminal displays the first target button in the virtual scene, the first target button may be removed from being displayed in the virtual scene, for example, the expansion button of the first target window may be removed from being displayed in the virtual scene if the distance between the virtual control object and the at least one first virtual item that can be picked up no longer meet the target condition, for example, if the distance between the virtual control object and the at least one first virtual item is greater than the target threshold, thereby expanding the visual field of the gamer in the virtual scene and improving user experience.

Optionally, on the other hand, after the terminal displays the first target button in the virtual scene, regardless whether the distance between virtual control object and the at least one first virtual item that can be picked up meets the target condition, the first target button may be displayed in the virtual scene all the time, to indicate to the gamer that the first target window may be displayed by operating the first target button.

In an optional implementation, after the terminal removes the first target button from being displayed in the virtual scene, the method further includes: displaying, by the terminal, the first target button, and skipping displaying the first target window in the virtual scene if the distance between the virtual control object and the at least one first virtual item that can be picked up meets the target condition again.

In this embodiment, after the terminal removes the first target button from being displayed in the virtual scene, the first target button is redisplayed in the virtual scene, and the first target window is no longer triggered to be displayed when the virtual control object appears again in the first item area and the distance between the virtual control object and the at least one first virtual item meets the target condition again. Optionally, in this case, if a third target operation performed on the first target button is detected on the client, the first target window is displayed in the virtual scene. For example, only when the expansion button of the first target window is tapped, the first target window may be displayed in the virtual scene to facilitate viewing of the identifier of the target items displayed in the first target window by the user to further select the required target items.

In an optional implementation, a display area of the first target button in the virtual scene is less than a display area of the first target window in the virtual scene, and/or a display area of the second target button in the virtual scene is less than a display area of the second target window in the virtual scene.

In this embodiment, the display area of the first target button in the virtual scene is less than the display area of the first target window in the virtual scene, and/or the display area of the second target button in the virtual scene is less than the display area of the second target window in the virtual scene in the virtual scene. For example, the first target button is a very small expansion button of the first target window, and the second target button is a very small expansion button of the second target window, so as not to block the visual field of the gamer in the virtual scene, so that the visual field of the gamer in the virtual scene is greatly improved, thereby improving experience of the gamer.

Optionally, in an example, the first target window of the terminal may be displayed in a first display area in the virtual scene, and the first display area may be an area in the virtual scene corresponding to the right half screen of a client screen. When the first target window is closed in the virtual scene, the first target button in the first display area is displayed instead of the first target window. In other words, the displayed first target window in the first display area is closed, then the first target button is displayed in the first display area. The first target button displayed in the first display area does not block the visual field of the gamer in the virtual scene, so that the visual field of the gamer in the virtual scene is greatly improved, thereby improving experience of the gamer.

Optionally, the second target window of this embodiment may be displayed in the second display area in the virtual scene, and the second display area may be an area in the virtual scene corresponding to the left half of the client screen. If the displayed second target window in the second display area is closed, then the second target button is displayed in the second display area. The second target button displayed in the second display area does not block the visual field of the gamer in the virtual scene, so that the visual field of the gamer in the virtual scene is greatly improved, thereby improving experience of the gamer.

In an optional implementation, step S204 of displaying, by the terminal, a first target window in the virtual scene if a distance between the virtual control object and the at least one first virtual item that can be picked up meets a target condition includes: displaying, by the terminal, the first target window in the virtual scene if a distance between the virtual control object and the at least one first virtual item that can be picked up is less than or equal to a target threshold. Step S208 of displaying, by the terminal, a second target button in the virtual scene if a distance between the virtual control object and at least one second virtual item that can be picked up meets the target condition includes: displaying, by the terminal, the second target button in the virtual scene if the distance between the virtual control object and the at least one second virtual item that can be picked up is less than or equal to the target threshold.

The terminal of this embodiment may detect whether the distance between the virtual control object and the at least one first virtual item that can be picked up is less than or equal to the target threshold. If detecting that the distance between the virtual control object and the at least one first virtual item that can be picked up is less than or equal to the target threshold, the terminal determines that the distance between the virtual control object and the at least one first virtual item that can be picked up meets the target condition, and further displays the first target window in the virtual scene. Optionally, according to this embodiment, a distance between the virtual control object and the target item in the first item area is calculated by using a position coordinate of the virtual control object in the virtual scene and a position coordinate of the target item in the first item area in the virtual scene, and the target item in the first item area whose distance from the virtual control object is less than or equal to the target threshold is included in the at least one first virtual item.

When the distance between the virtual control object and the at least one second virtual item that can be picked up is less than or equal to the target threshold, the terminal determines that the distance between the virtual control object and the at least one second virtual item that can be picked up meets the target condition, and further displays the second target button in the virtual scene. Optionally, according to this embodiment, a distance between the virtual control object and the target item in the second item area is calculated by using a position coordinate of the virtual control object in the virtual scene and a position coordinate of the target item in the second item area in the virtual scene, and the target item in the second item area whose distance from the virtual control object is less than or equal to the target threshold is included in the second virtual item.

Optionally, the target threshold of this embodiment is a preset maximum distance allowed between the target item and the virtual control object when the terminal is triggered to display the first target window in the virtual scene. For example, the target threshold is a width of a virtual control object in the virtual scene, and no limitation is imposed herein.

In an optional implementation, step S202 of controlling, by a terminal, in response to a first target operation instruction generated by a first target operation, movement of a virtual control object in a virtual scene displayed by a client includes: controlling, by the terminal in response to the first target operation instruction generated by the first target operation, movement of virtual attack equipment in a virtual scene displayed by a shooting game client, in this case, the client including the shooting game client, and the virtual control object including the virtual attack equipment. Step S204 of displaying, by the terminal, a first target window in the virtual scene if a distance between the virtual control object and the at least one first virtual item that can be picked up meets a target condition includes: displaying, by the terminal, the first target window in the virtual scene if a distance between the virtual attack equipment and first virtual attack accessory equipment that can be picked up meets the target condition, the at least one first virtual item including the first virtual attack accessory equipment, and the first target window being configured to display an identifier for each of the first virtual attack accessory equipment. Step S208 of displaying, by the terminal, a second target button in the virtual scene if a distance between the virtual control object and at least one second virtual item that can be picked up meets the target condition includes: displaying, by the terminal, the second target button in the virtual scene if a distance between the virtual attack equipment and second virtual attack accessory equipment that can be picked up meets the target condition, the second virtual item including the second virtual attack accessory equipment.

In this embodiment, the item display method in a virtual scene may be applied to a shooting game, and the shooting game may be an FPS or a TPS. The client may be a shooting game client, for example, an FPS client or a TPS client. The virtual control object may be virtual attack equipment in the shooting game, for example, the virtual attack equipment is a virtual gun and a pan controlled by a gamer. The virtual item may be virtual attack accessory equipment which may be equipped on the virtual attack equipment, for example, virtual attack accessory equipment such as a scope and a bullet equipped on the virtual gun.

The terminal controls, in response to the first target operation instruction generated by the first target operation, movement of the virtual attack equipment in the virtual scene displayed by the shooting game client, and displays the first target window in the virtual scene when the distance between the virtual attack equipment and the first virtual attack accessory equipment that can be picked up meets the target condition, for example, when the distance between the virtual attack equipment and the first virtual attack accessory equipment that can be picked up is less than or equal to the target threshold.

When the terminal detects on the client that the distance between the virtual attack equipment in the virtual scene displayed by the shooting game client and the first virtual attack accessory equipment that can be picked up meets the target condition, the terminal displays the first target window used for displaying an identifier of the first virtual attack accessory equipment in the virtual scene. The identifier of the first virtual attack accessory equipment, may be used as descriptions of each piece of target virtual attack accessory equipment, including information such as a name, an icon, a number, and the like, and no limitation is imposed herein.

After the terminal displays the first target window in the virtual scene, the terminal closes, in response to a second target operation instruction generated by a second target operation, the first target window in the virtual scene, and displays the first target button in the virtual scene. The first target window is displayed again in the virtual scene if a third target operation performed on the first target button is detected on a client.

In this embodiment, the state that the first target window is closed in the virtual scene will be stored and followed by subsequent target windows in other item areas in the virtual scene. Optionally, after the first target window is closed in the virtual scene, and the terminal displays the first target button in the virtual scene, displays the second target button in the virtual scene instead of the second target window when the distance between the virtual attack equipment and the second virtual attack accessory equipment that can be picked up meets the target condition, preventing the target window from displaying and occupying the visual field of a gamer in the virtual scene. After the terminal detects the third target operation performed on the second target button on the client, the second target window is displayed in the virtual scene. The second target window is used for displaying an identifiers of second virtual attack accessory equipment, so that the user can view the identifiers of the target items displayed in the second target window and select the required target items.

In this embodiment, a target window automatically pops up when the virtual control object approaches the virtual item. When the gamer closes the target window, only a small target button is displayed. When the gamer approaches the virtual item (including other virtual item) again, since the open/close state of the target window is remembered, the target window is no longer popped up, and only the target button corresponding to the target window is displayed. However, after the gamer operates the target button, the target window corresponding to the target button is redisplayed, which allows the gamer to observe more items around the scene conveniently and efficiently without interfering with observation of the surrounding battle condition, thereby improving the efficiency of displaying items, and further greatly improving game experience of the gamer.

The embodiments of the present disclosure further provides another item display method in a virtual scene.

Figure 3:
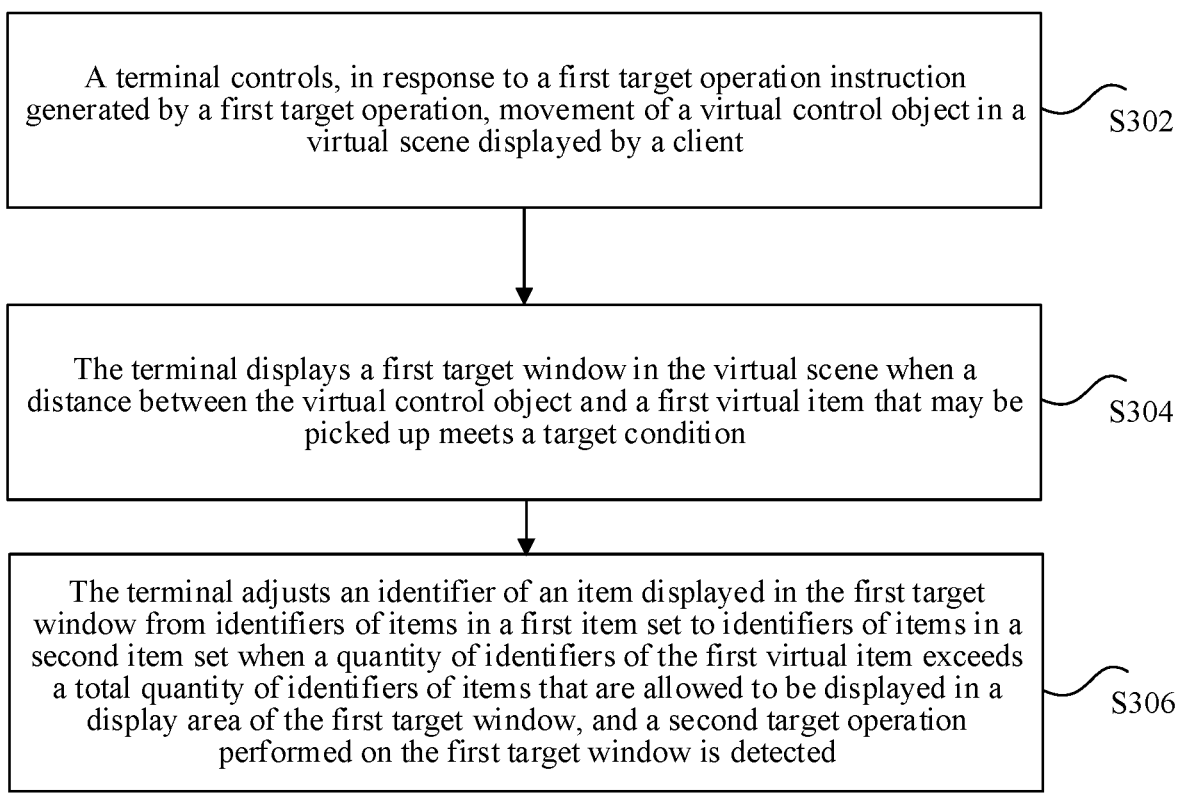
FIG. 3 is a flowchart of an item display method in another virtual scene according to an embodiment of the present disclosure.

FIG. 3 is a flowchart of an item display method in a virtual scene according to an embodiment of the present disclosure. As shown in FIG. 3, the method may include the following steps.

Step S302: A terminal controls, in response to a first target operation instruction generated by a first target operation, movement of a virtual control object in a virtual scene displayed by a client.

In the technical solution provided in step S302 of this application, the first target operation generates the first target operation instruction to control, in response to the first target operation instruction, movement of the virtual control object in the virtual scene displayed by the client.

Step S304: The terminal displays a first target window in the virtual scene if a distance between the virtual control object and the at least one first virtual item that can be picked up meets a target condition.

In the technical solution provided in step S304 of this application, the first target window is used for displaying at least one identifier each associated with one of the at least one first virtual item.

In this embodiment, after controlling, in response to the first target operation instruction generated by the first target operation, the movement of the virtual control object in the virtual scene displayed by the client, the terminal may detect whether the distance between the virtual control object and the at least one first virtual item that can be picked up meets the target condition, for example, detect whether the distance between the virtual control object in the virtual scene displayed by the client and the at least one first virtual item is less than or equal to a target threshold. If detecting that the distance between the virtual control object and the at least one first virtual item that can be picked up is less than or equal to the target threshold, the terminal determines that the distance between the virtual control object and the at least one first virtual item that can be picked up meets the target condition. The virtual control object may stop moving in the virtual scene, or may be moving. The at least one first virtual item of this embodiment may include a plurality of target items that can be picked up in a first item area.

After detecting that the distance between the virtual control object in the virtual scene displayed by the client and the at least one first virtual item that can be picked up meets the target condition, the terminal of this embodiment displays the first target window in the virtual scene. The first target window may be displayed at a specific location in the virtual scene in a semitransparent display mode, for example, displayed at the right side of the virtual scene, at the lower right corner of the virtual scene, and the like, so as not to interfere with observation of a battlefield situation in the virtual scene by a gamer. The identifier each associated with one of the at least one first virtual item is displayed in the first target window of this embodiment. The identifier is also an identifier of a target item included in the at least one first virtual item. The identifier may be used for indicating as descriptions of each target item in the at least one first virtual item in the virtual scene, including information such as a name, an icon, a number, and the like of each target item. No limitation is imposed herein.

Optionally, the identifier of each target may be displayed in the first target window in a vertical display manner, or may be displayed in the first target window in a vertical display manner in accordance with a priority order in which each target item is used by the virtual control object. For example, the more value the target item to the virtual control object, the higher priority the target item has.

Step S306: The terminal switches identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected.

In the technical solution provided in step S306 of this application, the identifiers of the at least one first virtual item includes identifiers of the items in the first item set and identifiers of the items in the second item set, and the identifiers of the items in the first item set may be the same as or completely different from the identifiers of the items in the second item set.

In this embodiment, the first target window displayed by the terminal in the virtual scene is an scrollable window, where the plurality of target items of the displayed first virtual item may be flexibly adjusted by using a target operation to view more target items existing in the first item area. After the terminal displays the first target window in the virtual scene, the first target window may be used for receiving the target operation of the gamer. Optionally, the target operation in this embodiment includes a second target operation, and the second target operation may be a sliding operation performed on the first target window.

The at least one first virtual item of this embodiment includes a plurality of target items, and the first item set in the at least one first virtual item is displayed in the display area of the first target window. For example, the plurality of target items included in the at least one first virtual item are medicines, scopes, bullets, body armor, and the like, the first item set includes medicines, scopes, and bullets, and these items are displayed in the display area of the first target window. When a quantity of identifiers of the at least one first virtual item exceeds a total quantity of identifiers of items allowed to be displayed in the display area of the first target window, that is, when a quantity of identifiers of a plurality of target items included in the at least one first virtual item exceeds the total quantity of identifiers of items allowed to be displayed in the display area of the first target window, the first target window may be used for receiving the second target operation.

When the terminal detects the second target operation performed on the first target window on the client, the terminal adjusts the identifier of the item displayed in the first target window from the identifiers of the items in the first item set to the identifiers of the items in the second item set. The identifiers of the at least one first virtual item of this embodiment includes the identifiers of the items in the first item set and the identifiers of the items in the second item set. The identifiers of the items in the second item set are displayed in the first target window when a user performs the second target operation on the first target window. Distances between each target item in the second item set and the virtual control object meet the target condition, and with the second target operation performed on the first target window, the identifiers of the items in the first item set is partially the same as or completely different from the identifiers of the items in the second item set.

The second target operation is merely an exemplary implementation of the embodiments of the present disclosure as an operation of sliding upward or downward. Any operation that may be used for triggering adjustment of the identifier of the item displayed in the first target window from the identifiers of the items in the first item set to the identifier of the item of the second item set to facilitate viewing of more target items in the first item area by the gamer is within the scope of this embodiment of the present disclosure, which is not described one by one by using an example herein.

Through steps S302 to S306, the first target operation is used for displaying different item sets in the first target window, so that information about more items can be displayed, thereby improving the technical effect of the efficiency of displaying items in virtual scene, and further resolving the technical problem of low efficiency of displaying items in the related art.

In an optional implementation, in step S304, after displaying the first target window in the virtual scene, the terminal closes the first target window in response to a second target operation instruction generated by a third target operation, and displays the first target button in the virtual scene. The terminal displays a second target button in the virtual scene if a distance between the virtual control object and at least one second virtual item that can be picked up meets the target condition.

In this embodiment, the third target operation is used for generating the second target operation instruction to trigger closing of the first target window in the virtual scene by the terminal. Optionally, when detecting, on the client, the third target operation performed on a window close icon on the first target window, the terminal closes the first target window in the virtual scene. The window close icon may be an icon used for instructing to close the first target window, and may be located at any location on the first target window to facilitate operation by the gamer. After the terminal closes the first target window in the virtual scene, the gamer will not see the first target window in the virtual scene, and will not see identifiers of a plurality of target items in the first item area, which avoids occupying the visual field range of the gamer in the virtual scene as a result of the first target window being displayed in the virtual scene all the time, thereby improving user experience.

The third target operation is a tap operation and a double-tap operation, which is merely an exemplary implementation of this embodiment of the present disclosure. Any operation that may be used for triggering the closing of the first target window in the virtual scene is within the scope of this embodiment of the present disclosure, which is not described one by one by using an example herein.

When the terminal closes the first target window in the virtual scene, the first target button in the virtual scene may be displayed instead of the first target window in the virtual scene. The first target window may be displayed in the virtual scene again by performing an operation on the first target button. The first target button does not block the visual field of the gamer in the virtual scene, so that the visual field of the gamer in the virtual scene is greatly improved, thereby improving experience of the gamer.

In this embodiment, the state that the first target window is closed in the virtual scene will be stored and followed by the subsequent target windows in other item areas in the virtual scene. In other words, after the terminal closes the first target window in the virtual scene, the target windows in other item areas in the virtual scene are also closed. The virtual scene of this embodiment may include a second item area different from the first item area. In response to the second target operation instruction generated by the third target operation, the first target window is closed in the virtual scene, and after the terminal displays the first target button in the virtual scene, the second target button is displayed in the virtual scene without displaying the second target window when the distance between the virtual control object and the at least one second virtual item that can be picked up in the second item area meets the target condition. In other words, after the first target window is closed in the virtual scene, even if the distance between the virtual control object and the at least one second virtual item that may be picked up meets the target condition, the second target window is not triggered to be displayed in the virtual scene, which prevents the subsequent target window from occupying the visual field of the gamer in the virtual scene.

In an optional implementation, after the terminal displays the first target button in the virtual scene, the terminal displays the first target window again in the virtual scene when detecting a fourth target operation performed on the first target button.

After the terminal closes the first target window in the virtual scene in response to the second target operation instruction generated by the third target operation, and displays the first target button in the virtual scene, the terminal displays the first target window again in the virtual scene when detecting, on the client, the fourth target operation performed on the first target button. In other words, when the fourth target operation performed on the first target button is detected on the client, the terminal redisplays the closed first target window in the virtual scene, so gamer may pick items from the first target window. The fourth target operation may be a tap operation, for example, a tap operation, a double-tap operation, or the like.

In an optional implementation, after displaying the second target button in the virtual scene, the terminal displays a second target window in the virtual scene when detecting the fourth target operation performed on the second target button. The second target window is used for displaying at least one identifier each associated with one of the at least one second virtual item.

The second target button of this embodiment may be an expansion button of the second target window and may be indicated by using an expansion icon. After the terminal displays the second target button in the virtual scene, the second target window is displayed in the virtual scene if the fourth target operation performed on the second target button is detected on the client, so that the user can view identifiers of target items displayed in the second target window and select the required target items.

In an optional implementation, step S306 of switching, by the terminal, identifiers of items displayed in the first target window from identifiers of items in a first item set to identifiers of items in a second item set if a quantity of identifiers of the at least one first virtual item exceeds the total quantity of identifiers that are allowed to be displayed in a display area of the first target window, and a second target operation performed on the first target window is detected includes: switching, by the terminal, identifiers displayed in the first target window from identifiers of items in a first item set to identifiers of items in a second item set if a quantity of identifiers of the at least one first virtual item exceeds a total quantity of identifiers that are allowed to be displayed in a display area of the first target window, and a sliding operation performed on a virtual sliding button of the first target window is detected, where the second target operation includes the sliding operation; or switching, by the terminal, the identifiers of the items displayed in the first target window from the identifiers of the items in the first item set to the identifiers of the items in the second item set if a quantity of identifiers of the at least one first virtual item exceeds a total quantity of identifiers that are allowed to be displayed in a display area of the first target window, and a sliding operation performed on the identifiers of the items in the first item set displayed by the first target window is detected.

In this embodiment, the first target operation may include a sliding operation, and the first target window may include a virtual sliding button used for receiving a sliding operation performed by a gamer on the first target window. The sliding operation may be an operation of sliding upward, or downward. The terminal adjusts the identifiers displayed in the first target window from the identifiers of the items in the first item set to the identifiers of the items in the second item set if the quantity of identifiers of the at least one first virtual item exceeds the total quantity of identifiers that are allowed to be displayed in the display area of the first target window. The identifier of the item in the second item set corresponds to a sliding direction of the sliding operation. For example, when the sliding operation performed on the virtual sliding button is an operation of sliding upward, the terminal may display, from below the first target window, an identifier that is of a target item in the second item set and that is not previously displayed in the first target window, so that the identifier of the target item that is not displayed in the first target window is slid upward in the first target window to closely follow other target items, and the identifier of the previously displayed target item is no longer displayed above the first target window.

When the sliding operation performed on the virtual sliding button of the first target window is the operation of sliding downward, an identifier that is of a target item in the second item set and that is not displayed in the first target window may be displayed from the top of the first target window, and the identifier of the previously displayed target item is no longer displayed at the bottom of the first target window, thereby ensuring a coherent order in which the target items are displayed in the first target window. Optionally, when the terminal detects, on the client, the sliding operation performed on the virtual sliding button of the first target window, an empty box may be displayed in the first target window if there is no identifiers of other target items in the at least one first virtual item may be displayed, or optionally, the currently displayed identifiers stay in the first target window.

Optionally, the terminal adjusts the identifiers of the items displayed in the first target window from the identifiers of the items in the first item set to the identifiers of the items in the second item set if the quantity of identifiers of the at least one first virtual item exceeds the total quantity of identifiers that are allowed to be displayed in the display area of the first target window, and the sliding operation performed on the identifiers of the items in the first item set displayed in the first target window is detected on the client. The identifier of the item in the second item set corresponds to a sliding direction of the sliding operation. For example, when the sliding operation performed on the identifiers of the items in the first item set is an operation of sliding upward, the identifier that is of the target item in the second item set and that is not previously displayed in the first target window may be displayed from the bottom of the first target window, so that the identifier of the target item that is not displayed in the first target window is slid upward in the first target window to closely follow other target items, and the identifier of the previously displayed target item displayed on top of the window disappears. When the sliding operation performed on the identifiers of the items in the first item set is the operation of sliding downward, identifiers that are of target items in the second item set and that are not displayed in the first target window may be displayed from the top of the first target window, and the identifier of the previously displayed target item displayed at the bottom of the first target window disappears, thereby ensuring a coherent order in which the target items are displayed in the first target window. Optionally, when the terminal detects, on the client, the sliding operation performed on the identifiers of the items in the first item set, the terminal displays an empty box in the first target window if there no identifiers of other target items in the at least one first virtual item may be displayed, or optionally, the currently displayed identifiers stay in the first target window.

In an optional implementation, after step S304 in which the terminal displays the first target window in the virtual scene, the method further includes: obtaining, by the terminal, attribute information of first target items currently being used by the virtual control object; determining, by the terminal according to the attribute information of the first target items, a priority order of candidate target items from the at least one first virtual item according to needs of the virtual control object; and sequentially displaying, by the terminal, in a display area of the first target window, identifiers of the target items included in the at least one first virtual item according to the priority order.

In this embodiment, the first target item is an item currently being used by the virtual control object. For example, the first target item is a body armor currently equipped on the virtual control object, and attribute information of the first target item may be rating level information of the first target item, information about whether the first target item is complete, and the like. For example, the attribute information is rating level information of body armor, information about whether the body armor is complete, and the like. After obtaining the attribute information of the first target item currently being used by the virtual control object, the terminal determines, according to the attribute information of the first target item, the priority order of candidate target items from the at least one first virtual item according to needs of the virtual control object. In other words, the terminal determines the priority order in which the plurality of target items included in the at least one first virtual item if assuming they are used by the virtual control object respectively, and the terminal sequentially displays, in the display area of the first target window, the identifiers of items of the plurality of target items according to the priority order.

For example, the plurality of target items included in the plurality of target items are a helmet, a weapon, a bullet, and a body armor. When a level of the body armor used by the virtual control object is lower than that of the body armor in target items, a priority order of the plurality of target items is determined as the body armor, the helmet, the weapon, and the bullet, where the body armor has the highest priority.

For another example, there is a body armor in the first item area. When the virtual control object has no body armor, the body armor in the first item area has the first priority, and the body armor in the first item area that is not picked up is displayed on top in the first target window. When the rating level of the body armor used by the virtual control object is lower than the rating level of the body armor in the first item area, the body armor in the first item area has the first priority, and the body armor in the first item area that is not picked up is displayed on top in the first target window. When the rating level of the body armor used by the virtual control object is greater than or equal to the rating level of the body armor in the first item area, but the body armor is broken, the body armor in the first item area has the first priority, and the body armor in the first item area that is not picked up is displayed on top of the first target window. For example, the rating level of the body armor used by the virtual control object is level II, and the level of the body armor in the first item area is also level II. If the body armor use by the virtual control object is broken, the level II body armor in the first item area that is not picked up is placed on top of the first target window. If the body armor use by the virtual control object is of level III, and the body armor in the first item area is of level II, it is determined whether the remaining durability of the body armor on the virtual control object meets the standard of replacing the level II body armor in the first item area. If the standard of replacing the level II body armor in the first item area is met, the level II body armor in the first item area is displayed on top of the first target window. When the level of the body armor used by the virtual control object is higher than the level of the body armor in the first item area, and the body armor is complete, the priority of the body armor in the first item area may be lower than that of the helmet, the weapon, the bullet, and the like.

In an optional implementation, step S306 of switching, by the terminal, identifiers of items displayed in a first target window from identifiers of items in a first item set to identifiers of items in a second item set includes: switching, by the terminal, to the identifiers of the items in the second item set that are sequentially displayed according to the priority order.

In this embodiment, the terminal switches, to identifiers of items in a second item set that are sequentially displayed according to the priority order, if a quantity of identifiers of the at least one first virtual item exceeds a total quantity of identifiers that are allowed to be displayed in a display area of the first target window, and a second target operation performed on the first target window is detected on the client. For example, the items in the first item set displayed according to the priority order are: a body armor, a helmet, and a weapon, and the items in the second item set displayed according to the priority order are: a helmet, a weapon, and bullets. Identifiers will be displayed according to the priority order after the switch.

In an optional implementation, during step S306 in which the terminal adjusts identifiers of items displayed in the first target window from identifiers of items in a first item set to identifiers of items in a second item set, the method further includes: displaying, by the terminal, in a target area of first target window, an identifier of a target item with the highest priority, where both the first item set and the second item set both include the target item with the highest priority.

In this embodiment, when the terminal switches the identifiers of the items displayed in the first target window from the identifiers of the items in the first item set to the identifiers of the items in the second item set, the terminal displays, in the target area of the first target window, the identifier of the target item with the highest priority in the plurality of target items. Optionally, with the second target operation performed on the first target window, the identifier of the target item with the highest priority remains to be displayed in the target area of the first target window. The target area may be a top area of the first target window, thereby facilitating the selection of the gamer and improving the efficiency of processing items.

For example, the plurality of target items included in the at least one first virtual item are: a helmet, a weapon, bullets, and a body armor. It is determined that the priority order is: the body armor, the helmet, the weapon, and the bullet. The body armor is the target item with the highest priority, and then is always displayed in the top area of the first target window. For example, the first item set includes the body armor, the helmet, and the weapon, and the second item set includes the body armor, the weapon, and the bullet. Therefore, the first item set and the second item set both include the body armor, and the body armor in the first item set and the body armor in the second item set are both displayed on the top area of the first target window, thereby facilitating the selection of the gamer and improving the efficiency of processing items.

In an optional implementation, after the terminal determines, according to the attribute information of the first target item, a priority order of target items, the method further includes: controlling, by the terminal, the target item with the highest priority to be added to a virtual container if the target item with the highest priority is not added to the virtual container of the virtual scene within a target time, an item stored in the virtual container may be used by the virtual control object in the virtual scene.

In this embodiment, after the determining, by the terminal according to the attribute information of the first target item, a priority order of target items, when the target item with the highest priority is not picked up and added to the virtual container of the virtual scene within a target time, the terminal adds the target item with the highest priority to the virtual container automatically. Optionally, when the target item with the highest priority stays for a preset period of time and is still not picked up by the gamer into a virtual container, the terminal controls the target item with the highest priority to be automatically added to the virtual container and being used by the virtual control object, where the virtual container may be a backpack corresponding to the virtual control object.

In an optional implementation, after step S304 in which the terminal displays the first target window in the virtual scene, the method further includes: adding, by the terminal, a second target item to the virtual container of the virtual scene if a fifth target operation performed on an identifier of the second target item in the at least one first virtual item is detected, the second target item may be used by virtual control object; and deleting, by the terminal, the identifier of the second target item from the first target window, and displaying, in the first target window, an identifier of a third target item in the at least one first virtual item, the identifier of the third target item is not displayed in the first target window before the identifier of the second target item is deleted.

In this embodiment, after the terminal displays the first target window in the virtual scene, the gamer may select, from the first target window, a target item that needs to be added to the virtual container to be used in the virtual scene. When the terminal detects, on the client, the fifth target operation performed on the identifier of the second target item in the at least one first virtual item, the second virtual item is added to the virtual container of the virtual scene. Optionally, when the virtual container is not completely occupied by stored items, the second target item is directly added to the virtual container of the virtual scene.

The fifth target operation of this embodiment may be a tap operation, a sliding operation, or the like. The virtual container of the virtual scene may be a backpack for storing items in the virtual scene, where the stored items may be used by the virtual control object. The first item set or the second item set includes a second target item. In other words, before the second target operation performed on the first target window may be detected on the client, the second target item is selected according to the identifiers of the items in the first item set or the second item set after the second target operation performed on the first target window is detected on the client.

The fifth target operation of this embodiment is a tap operation and a sliding operation, which is merely an exemplary implementation of this embodiment of the present disclosure. Any operation that may be used for triggering adding of the second target item to the virtual container of the virtual scene is within the scope of this embodiment of the present disclosure, which is not described one by one by using an example herein.

In this embodiment, after the terminal adds the second target item selected from the first item set or the second item set to the virtual container of the virtual scene, the identifier of the second target item may be deleted from the first target window. In other words, the identifier of the second target item is no longer displayed in the first target window, and the terminal may display, in the first target window, the identifier of the third target item in the at least one first virtual item. The identifier of the third target item may be an identifier that is not displayed in the first item area in the first target window before the terminal deletes the identifier of the second target item, and may be an identifier of an item having a certain priority.

In an optional implementation, after step S304 in which the terminal displays the first target window in the virtual scene, the method further includes: displaying target prompt information in the virtual scene if a fifth target operation performed on the identifier of the second target item in the at least one first virtual item is detected, and the virtual container of the virtual scene is completely occupied by stored items, the target prompt information being used for reminding that the virtual container is full, and the items stored in the virtual container may be used by the virtual control object in the virtual scene.

In this embodiment, the fifth target operation is used for triggering the terminal to add the second target item to the virtual container of the virtual scene. Before the second target item is added to the virtual container of the virtual scene, it may be detected whether the virtual container of the virtual scene is full. If the terminal detects that the virtual container of the virtual scene is full, the terminal determines that storage space in the virtual container is insufficient to store new items in the virtual container, then displays the target prompt information in the virtual scene to remind that the virtual container is full, and the gamer may delete some items stored in the virtual container to free up enough storage space to store the second target item.

In an optional implementation, a blocking object in the virtual scene may exist between target items in the at least one first virtual item and the virtual control object, and the blocking object is configured to prevent the virtual control object from obtaining a target item.

In this embodiment, the blocking object may be an object that prevents the virtual control object from acquiring a target item in the virtual scene. For example, the blocking object is an obstacle such as a wall, a tree, a mountain, or the like in the virtual scene. If there is a blocking object between the target item and the virtual control object, the target item cannot be included in the at least one first virtual item even if the distance between the target item and the virtual control object satisfies the target condition, for example, even if the distance between the target item and the virtual control object is less than or equal to the target threshold, the target item may not be displayed in the first target window.

In an optional implementation, step S304 of displaying, by the terminal, a first target window in the virtual scene if a distance between the virtual control object and the at least one first virtual item that can be picked up meets a target condition includes: displaying, by the terminal, the first target window in the virtual scene if a distance between the virtual control object and the at least one first virtual item that can be picked up is less than or equal to a target threshold. Step S306 of displaying, by the terminal, a second target button in the virtual scene if a distance between the virtual control object and at least one second virtual item that can be picked up meets the target condition includes: displaying, by the terminal, the second target button in the virtual scene if the distance between the virtual control object and the at least one second virtual item that can be picked up is less than or equal to the target threshold.

The terminal of this embodiment may detect whether the distance between the virtual control object and the at least one first virtual item that can be picked up is less than or equal to the target threshold. If it is detected that the distance between the virtual control object and the at least one first virtual item that can be picked up is less than or equal to the target threshold, the terminal determines that the distance meets the target condition, and further displays the first target window in the virtual scene.

When the distance between the virtual control object and the at least one second virtual item that can be picked up is less than or equal to the target threshold, the terminal determines that the distance meets the target condition, and further displays the second target button in the virtual scene.

Optionally, the target threshold of this embodiment is a preset maximum distance between the target item and the virtual control object when the first target window is triggered to be displayed in the virtual scene. For example, the target threshold is a width of a virtual control object in the virtual scene, and no limitation is imposed herein.

In an optional implementation, step S302 of controlling, by a terminal, in response to a first target operation instruction generated by a first target operation, movement of a virtual control object in a virtual scene displayed by a client includes: controlling, by the terminal in response to the first target operation instruction generated by the first target operation, movement of virtual attack equipment in a virtual scene displayed by a shooting game client, the client including the shooting game client, and the virtual control object including the virtual attack equipment. Step S304 of displaying, by the terminal, a first target window in the virtual scene if a distance between the virtual control object and the at least one first virtual item that can be picked up meets a target condition includes: displaying, by the terminal, the first target window in the virtual scene if a distance between the virtual attack equipment and first virtual attack accessory equipment that can be picked up meets the target condition, the at least one first virtual item including the first virtual attack accessory equipment, and the first target window being configured to display an identifier for each of the first virtual attack accessory equipment. Step S306 of switching, by the terminal, identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected includes: switching, by the terminal, identifiers of virtual attack equipment displayed in the first target window from identifiers of virtual attack accessory equipment in a first virtual attack accessory equipment set to identifiers of virtual attack accessory equipment in a second virtual attack accessory equipment set if a quantity of identifiers of the first virtual attack accessory equipment exceeds a total quantity of identifiers that are allowed to be displayed in a display area of the first target window, and the second target operation performed on the first target window is detected, the identifiers of the first virtual attack accessory equipment including the identifier of the virtual attack accessory equipment in the first virtual attack accessory equipment set and the identifier of the virtual attack accessory equipment in the second virtual attack accessory equipment set, and the identifier of the virtual attack accessory equipment in the first virtual attack accessory equipment set and the identifier of the virtual attack accessory equipment in the second virtual attack accessory equipment set being partially identical or completely different.

In this embodiment, the item display method in a virtual scene may be applied to a shooting game, and the shooting game may be an FPS or a TPS. The client may be a shooting game client, for example, an FPS client or a TPS client. The virtual control object may be virtual attack equipment in the shooting game, for example, the virtual attack equipment is a virtual gun and a pan controlled by a gamer. The virtual item may be virtual attack accessory equipment to be equipped on the virtual attack equipment, for example, virtual attack accessory equipment such as a scope and a bullet equipped on the virtual gun.

The terminal controls, in response to the first target operation instruction generated by the first target operation, movement of the virtual attack equipment in the virtual scene displayed by the shooting game client, and displays the first target window in the virtual scene when the distance between the virtual control object and the at least one first virtual item that can be picked up meets the target condition. When the distance between the virtual attack equipment in the virtual scene displayed by the shooting game client and the first virtual attack accessory equipment that can be picked up meets the target condition, the terminal displays the first target window used for displaying identifiers of the first virtual attack accessory equipment in the virtual scene. The identifier of the first virtual attack accessory equipment, that is, identifiers of a plurality of pieces of target virtual attack accessory equipment included in the first virtual attack accessory equipment, may be used as descriptions of each piece of target virtual attack accessory equipment in the first virtual attack accessory equipment in the virtual scene, including information such as a name, an icon, a number, and the like, and no limitation is imposed herein.

After displaying the first target window in the virtual scene, the terminal switches identifiers of virtual attack equipment displayed in the first target window from identifiers of virtual attack accessory equipment in a first virtual attack accessory equipment set to an identifiers of virtual attack accessory equipment in a second virtual attack accessory equipment set if a quantity of identifiers of the first virtual attack accessory equipment exceeds a total quantity of identifiers that are allowed to be displayed in a display area of the first target window, and the second target operation performed on the first target window is detected. The identifiers of the first virtual attack accessory equipment of this embodiment include the identifier of the virtual attack accessory equipment in the first virtual attack accessory equipment set and the identifier of the virtual attack accessory equipment in the second virtual attack accessory equipment set. The virtual attack accessory equipment in the second virtual attack accessory equipment set is target virtual attack accessory equipment that is in the first virtual attack accessory equipment and that is displayed in the first target window when the user performs the first target operation on the first target window. The distance between each piece of target virtual attack accessory equipment in the second virtual attack accessory equipment set and the virtual attack equipment is less than or equal to the target threshold. In addition, with the second target operation performed on the first target window, the identifier of the virtual attack accessory equipment in the first virtual attack accessory equipment set and the identifier of the virtual attack accessory equipment in the second virtual attack accessory equipment set are partially identical or completely different, so that the gamer can view more target items in the first item area for selection as needed, thereby avoiding a problem that items displayed by a window in the virtual scene are fixed and cannot be flexibly adjusted for viewing more items, and further improving the efficiency of processing the items.

In this embodiment, during the game, the gamer can conveniently and efficiently observe more items around the virtual scene without interfering with observation of the surrounding battle situation by the gamer, thereby resolving the problem of inconvenience of freely selecting and picking up items on the terminal, improving the efficiency of displaying items, and further greatly improving game experience of the gamer.

The technical solution of the present disclosure is to be described below with reference to exemplary embodiments.

In this embodiment, the virtual control object controlled by the gamer in the virtual scene needs to pick up a large number of items. For example, the virtual scene is a shooting game scene, and the virtual control object is controlled on a map of the game scene to pick up a large number of items, where the virtual control object may be an object controlled by the gamer in the virtual scene, for example, virtual attack equipment such as a virtual gun, a pan, and the like. The items may be virtual attack accessory equipment equipped on the virtual attack equipment, for example, body armor, bullets, medicines, and the like. In this embodiment, the items may be displayed vertically in the virtual scene, and the items may be displayed vertically according to a priority in which the items are used in the virtual scene. In addition, after the virtual control object picks up one item, an item with next higher priority automatically moves up, and more items can be viewed by dragging and pulling down a window.

The following describes the item display method in a virtual scene of this embodiment in detail.

Figure 4:
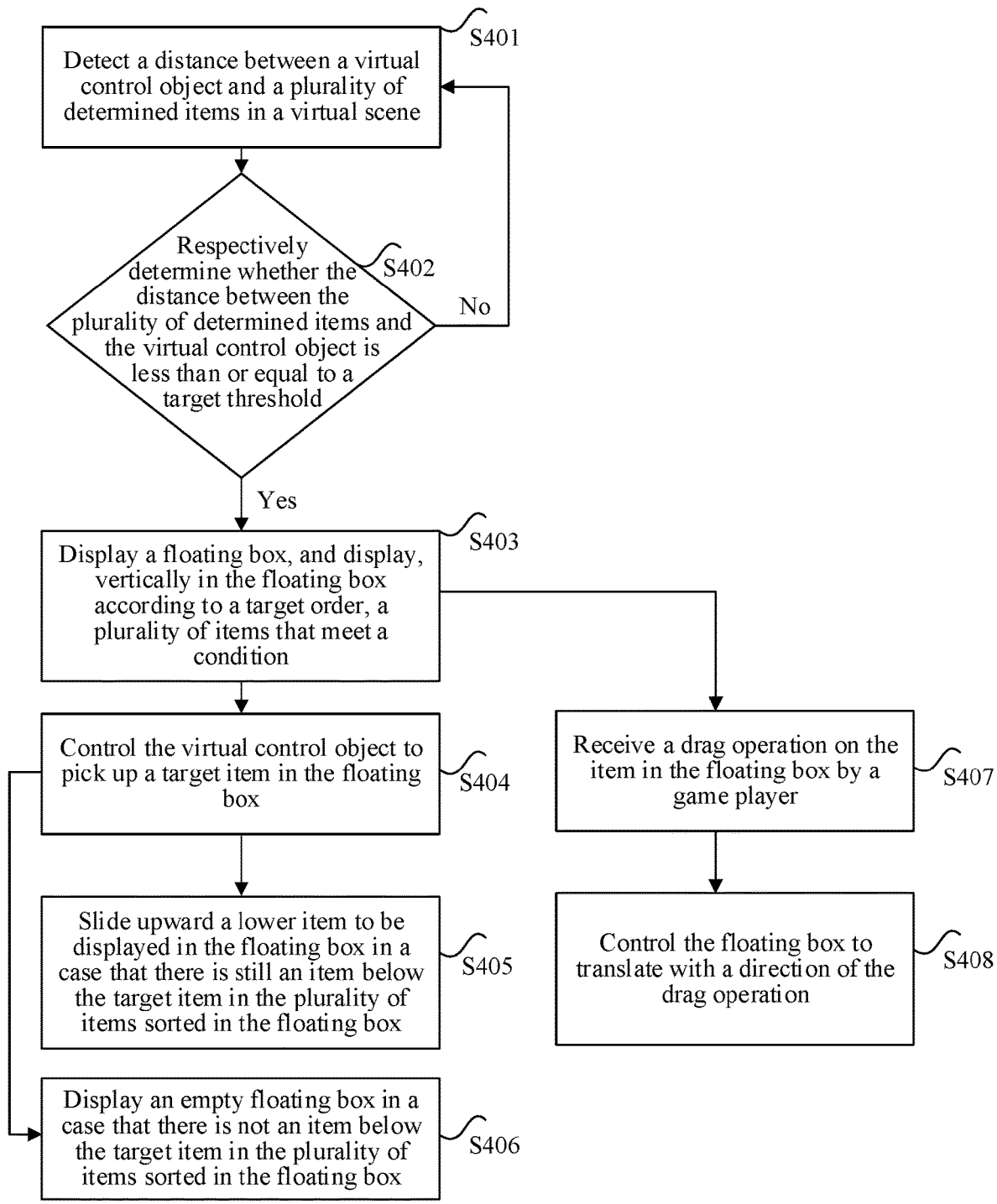
FIG. 4 is a flowchart of an item display method in another virtual scene according to an embodiment of the present disclosure.

FIG. 4 is a flowchart of an item display method in another virtual scene according to an embodiment of the present disclosure. As shown in FIG. 4, the method includes the following steps:

Step S401: Detect a distance between a virtual control object and a plurality of determined items in a virtual scene.

In this embodiment, a distance between a virtual control object corresponding to a gamer and the plurality of determined items in the virtual scene is detected. Optionally, a first coordinate of the determined item in the virtual scene and a second coordinate of the virtual control object corresponding to the gamer in the virtual scene are obtained, and a distance between the determined item and the virtual control object is determined by calculating the distance between the first coordinate and the second coordinate.

Step S402: Determine whether the distance between the plurality of determined items and the virtual control object is less than or equal to a target threshold respectively.

After the distance between the virtual control object and the plurality of determined items in the virtual scene is detected, it is determined respectively whether the distance between the plurality of determined items and the virtual control object is less than or equal to the target threshold, to determine whether the determined items can be picked up.

Optionally, the target threshold of this embodiment may be the maximum distance allowed between the determined item and the virtual control object in the virtual scene. For example, the maximum distance is a width of the virtual control object in the virtual scene, and a distance obtained through calculation is compared with the maximum distance. If the distance is less than or equal to the maximum distance, step S403 is performed, and an item whose distance from the virtual control object is less than or equal to the maximum distance may be picked up and put into a backpack of the virtual control object. If the distance is greater than the maximum distance, step S401 is performed, and it is to be determined whether the distance between other determined items and the virtual control object is less than or equal to the maximum distance.

Optionally, if there is an obstacle or blocking item between the determined item and the virtual control object, the determined item cannot be picked up even if the distance between the determined item and the virtual control object is less than or equal to the maximum distance. The obstacle may be an object such as a wall, a tree, a mountain, and the like in the virtual scene and it is used for preventing the virtual control object from acquiring items, and no limitation is imposed herein.

Step S403. Display a floating box, display, vertically according to a target order, a plurality of items meeting a condition in the floating box.

After it is respectively determined whether the distance between the plurality of determined items and the virtual control object is less than or equal to the target threshold, a floating box will be triggered if there is a determined item whose distance from the virtual control object is less than or equal to the target threshold. The floating box may be an item box or a pickup box, which is used for displaying, vertically according to the target order, a plurality of items that meet the condition. The target order may be determined based on the priority of the items as described before. In other words, the determined item whose distance from the virtual control object is less than or equal to the target threshold is vertically displayed. The item displayed in the floating box may be picked up by the virtual control object, and may appear, by default, in the lower right corner of the virtual scene displayed by a client. The gamer may see, by using the floating box, all the items that may be picked up around the virtual control object, and there is a close button on the floating box to instruct a user to close the displayed floating box in the virtual scene.

Step S404: Control the virtual control object to pick up a target item in the floating box.

After the plurality of items meeting the condition are displayed vertically in the floating box according to the target order, the virtual control object may pick up the target item in the plurality of items in the floating box.

Optionally, if the gamer controls the virtual control object to pick up the target item from the floating box, it is necessary to determine whether space of the backpack for storing the item is enough to store the target item. If the backpack has enough space, the item is picked up, and the picked item is added to the backpack. If there is not enough space in the backpack, a prompt message is displayed to remind the gamer that the backpack is full and the target item can no longer be added. The gamer may delete some stored items in the backpack to make enough space to store the target item that needs to be picked up.

Step S405: In the plurality of items sorted in the floating box, if there is still an item below the target item, the item is moved upward and displayed in the floating box.

After the virtual control object is controlled to pick up the target item in the floating box, if there is still an item currently not displayed, the item is moved upward and displayed in the floating box, to closely follow other items in the floating box. For example, after the target item is picked up in the floating box, the items outside the display range of the floating box move up, to ensure that the order of the items displayed in the floating box remains coherent.

Step S406: In the plurality of items sorted in the floating box, if there is no item below the target item, an empty box is displayed in the floating box.

After the virtual control object is controlled to pick up the target item in the floating box, if there is no item below the target item, the empty box is displayed in the floating box.

Step S407: Receive a drag operation of a gamer on the items in the floating box.

After the floating box is displayed, and the plurality of items that meet the condition are displayed vertically in the floating box according to the target order, the drag operation of the gamer on the items in the floating box may be received. The drag operation may be used to move the floating box to another display location.

Step S408: Control the floating box to translate with a direction of the drag operation.

After the drag operation of the gamer on the items in the floating box is received, the floating box is controlled to translate with the direction of the drag operation. For example, the floating box may be moved up or down in the virtual scene.

Optionally, the drag operation in this embodiment includes a dragging and pull-down operation. If there are other items that can be picked up outside the display range of the floating box, the dragging and pull-down operation of the gamer on the items in the floating box may be received. If there are no other items that can be picked up outside the display range of the floating box, the dragging and pull-down operation of the gamer on the items in the floating box cannot be received.

In this embodiment, a distance between the virtual control object controlled by the gamer and the item in the virtual scene is a monitored in real-time. As long as the distance between the virtual control object and the item in the virtual scene is less than or equal to the target threshold, a floating box or an expansion button corresponding to the floating box may be displayed in the virtual scene, and the gamer may perform an operation such as picking up, dragging or scrolling to view, closing, and the like on the floating box. The order of the items displayed in the floating box follows preset sequence logic such as the priority of the items, to ensure that the gamer can always see the items they need most.

In this embodiment, when an item appears in an item area, it is necessary to determine a degree of importance of the item in the virtual scene. The following describes, by using the display logic of the item as a rating level II body armor, the order of the items displayed in the floating box.

Figure 5:
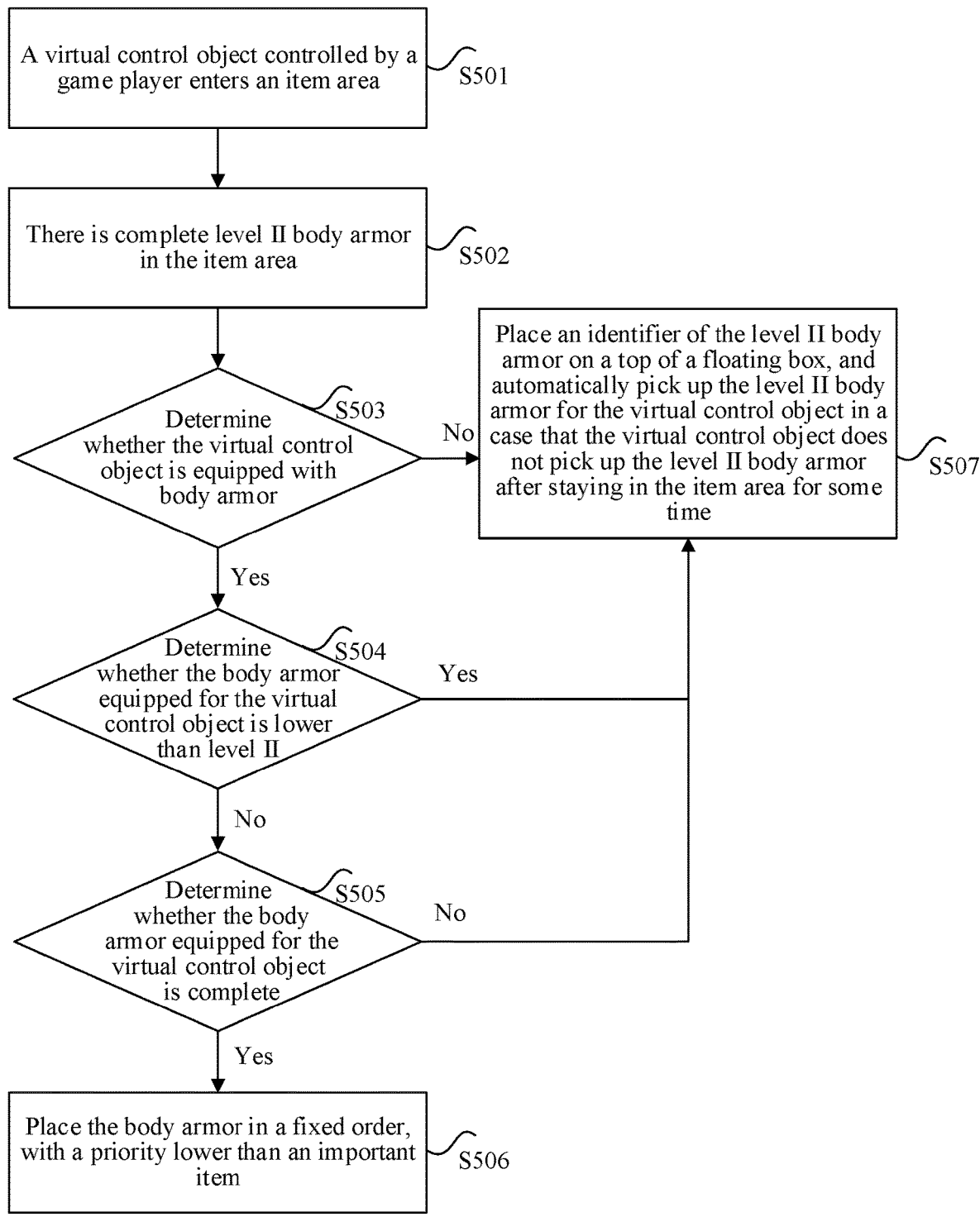
FIG. 5 is a flowchart of an item display method in another virtual scene according to an embodiment of the present disclosure.

FIG. 5 is a flowchart of an item display method in another virtual scene according to an embodiment of the present disclosure. As shown in FIG. 5, the method includes the following steps.

Step S501: A virtual control object controlled by a gamer enters an item area.

The item area in this embodiment, that is, a prop area, may include props in a plurality of virtual scenes, and the virtual control object controlled by the gamer enters the item area.

Step S502: There is a complete level II body armor in the item area.

After the virtual control object controlled by the gamer enters the item area, a complete level II body armor appears in the item area, where the item area is also an item pickup area.

Step S503: Determine whether the virtual control object is equipped with body armor.

When there is a complete level II body armor appears in the item area, it is determined whether the virtual control object is equipped with body armor. If it is determined that the virtual control object is equipped with body armor, step S504 is performed. If it is determined that the virtual control object is not equipped with body armor, the level II body armor is determined as an important item, and step S507 is performed.

Step S504: Determine whether the body armor equipped for the virtual control object is below level II.

After it is determined whether the virtual control object is equipped with body armor, it is determined whether the body armor equipped for the virtual control object is below level II if it is determined that the virtual control object is equipped with the body armor. If it is determined that the body armor is below level II, the level II body armor is determined as an important item, and step S507 is performed. If it is determined that the body armor is not below level II, step S505 is performed.

Step S505: Determine whether the body armor equipped for the virtual control object is complete.

After it is determined whether the body armor equipped for the virtual control object is below level II, it is determined whether the body armor equipped for the virtual control object is complete if it is determined that the body armor equipped for the virtual control object is not below level II.

Optionally, if the body armor equipped for the virtual control object is the level II body armor, step S507 is performed as long as the body armor equipped for the virtual control object is broken, or otherwise step S506 is performed.

Optionally, if the body armor equipped for the virtual control object is level III body armor, it is determined whether remaining durability of the level III body armor has met the standard (which may be configured) for being replaced with level II body armor. If the standard for being replaced with level II body armor is met, it is determined that the level II body armor is an important item, and step S507 is performed. If the standard for being replaced with level II body armor is not reached, step S506 is performed.

Step S506: Place body armor in an ordinary order, with a priority lower than the important item.

After it is determined whether the body armor is complete, if it is determined that the body armor is complete, the level II body armor is no longer marked as an important item, and the body armor is placed in an ordinary order, with a priority lower than the important item which may be an item such as a helmet, a weapon, a bullet, and the like.

Step S507: Place an identifier of the level II body armor on the top of the floating box, and after the virtual control object stays in the item area for some time, automatically pick up the level II body armor for the virtual control object if the level II body armor has not been actively picked up.

After it is determined whether the virtual control object is equipped with body armor, the level II body armor is determined as an important item, and the level II body armor is placed on the top of the floating box if it is determined that the virtual control object is not equipped with the body armor. After it is determined whether the body armor equipped for the virtual control object is below level II, the level II body armor is determined as an important item, and the identifier of the level II body armor is placed on the top of the floating box if it is determined that the body armor equipped for the virtual control object is below level II. After it is determined whether the body armor equipped for the virtual control object is complete, the level II body armor is determined as an important item, and the identifier of the level II body armor is placed on the top of the floating box if it is determined that the body armor equipped for the virtual control object is broken.

In this embodiment, after the virtual control object stays in the item area for some time, the level II body armor is automatically picked up for the virtual control object if the level II body armor has not been actively picked up, to improve the operation level of the virtual control object in the virtual scene, thereby improving experience of the gamer. The duration of the stay time may be preset and adjusted.

Whether other items in the floating box are displayed in the virtual scene may also be determined by using similar determining logic of the foregoing level II body armor, which is not described one by one by using an example herein.

For the application environment in this embodiment of the present disclosure, reference may be made to, but not limited to, the application environment in the foregoing embodiment, and the details are not described herein again in this embodiment. The embodiments of the present disclosure provide an optional specific application used for implementing the foregoing item display method in a virtual scene.

In this embodiment, the virtual scene may be at least one shooting game scene, for example, an FPS game scene or a TPS game scene.

Figure 6:
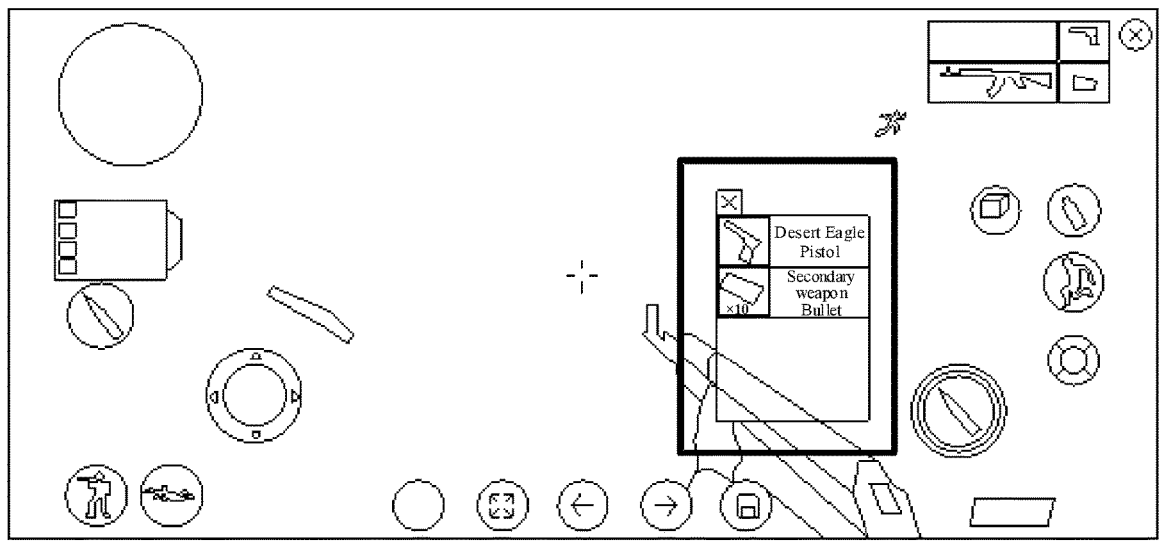
FIG. 6 is a schematic diagram of an item display scene according to an embodiment of the present disclosure.

FIG. 6 is a schematic diagram of an item display scene according to an embodiment of the present disclosure. As shown in FIG. 6, the virtual scene is an FPS virtual scene. In the FPS game scene, when a virtual control object controlled by a gamer encounters an item for the first time in the virtual scene, a floating box (a rectangle wireframe shown in FIG. 6) is displayed in the virtual scene. For example, when the virtual control object passes through an item area and a distance between the virtual control object and an item in the item area is less than or equal to a target threshold, a floating box will appear in the right half area of the virtual scene, in which information about the items in the item area in the virtual scene is displayed, for example, information such as a name, an icon, a number, and the like of the item. For example, items "Desert Eagle Pistol", "secondary weapon bullet", and the like are displayed. The floating box may be a semitransparent floating box. The gamer may select a required item according to requirements of the virtual control object, and may see information about all items in all item areas by sliding the items in the floating box.

Optionally, if information about items in the item area is not required, the gamer may click the "x" button on the upper right of the floating box to close the displayed floating box in the item area. The "x" button may be displayed in the upper left corner of the floating box, or in the upper right corner, and no limitation is imposed herein. After the floating box is closed, the floating box is no longer triggered to be displayed when the virtual control object passes through the item area again.

Figure 7:
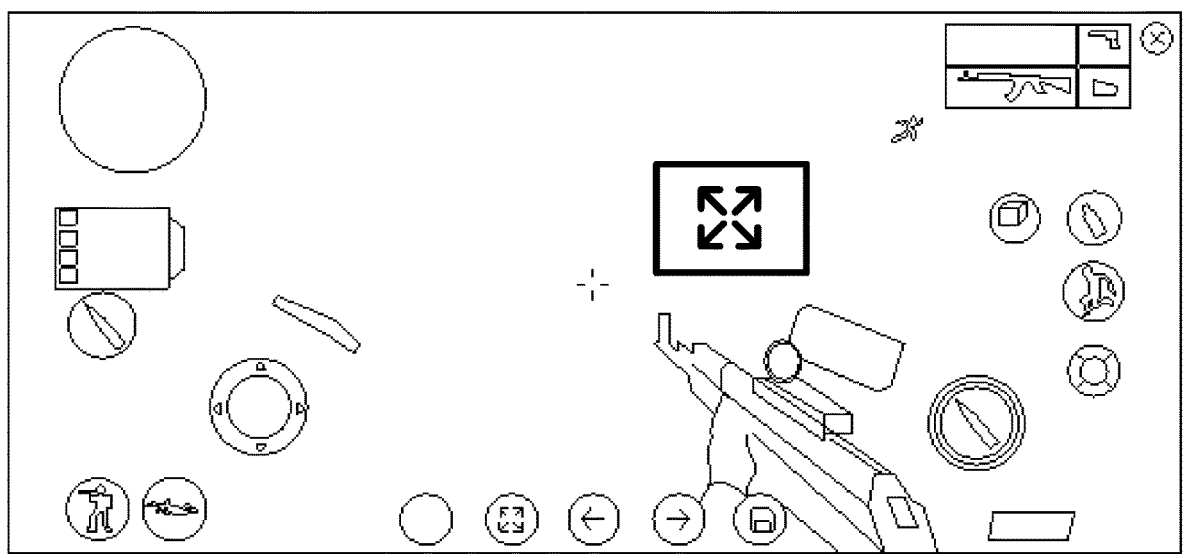
FIG. 7 is a schematic diagram of another item display scene according to an embodiment of the present disclosure.

FIG. 7 is a schematic diagram of another item display scene according to an embodiment of the present disclosure. As shown in FIG. 7, a virtual scene is an FPS virtual scene. In the FPS game scene, when a virtual control object passes through an item area, a floating box is displayed in the virtual scene. After the displayed floating box in the item area is closed, an expansion button (a direction arrow pointing to the four corners shown on the top in FIG. 7) is displayed at a position of the floating box.

After the floating box is closed in the virtual scene, only the expansion button is displayed in the item area, so that the field of vision of a gamer in the virtual scene is greatly increased, so as not to interfere with observation of the battle situation in the virtual scene by the gamer. When the gamer clicks the expansion button again, the floating box may be triggered to be displayed again in the virtual scene, thereby improving the flexibility of the floating box being displayed in the virtual scene.

Figure 8:
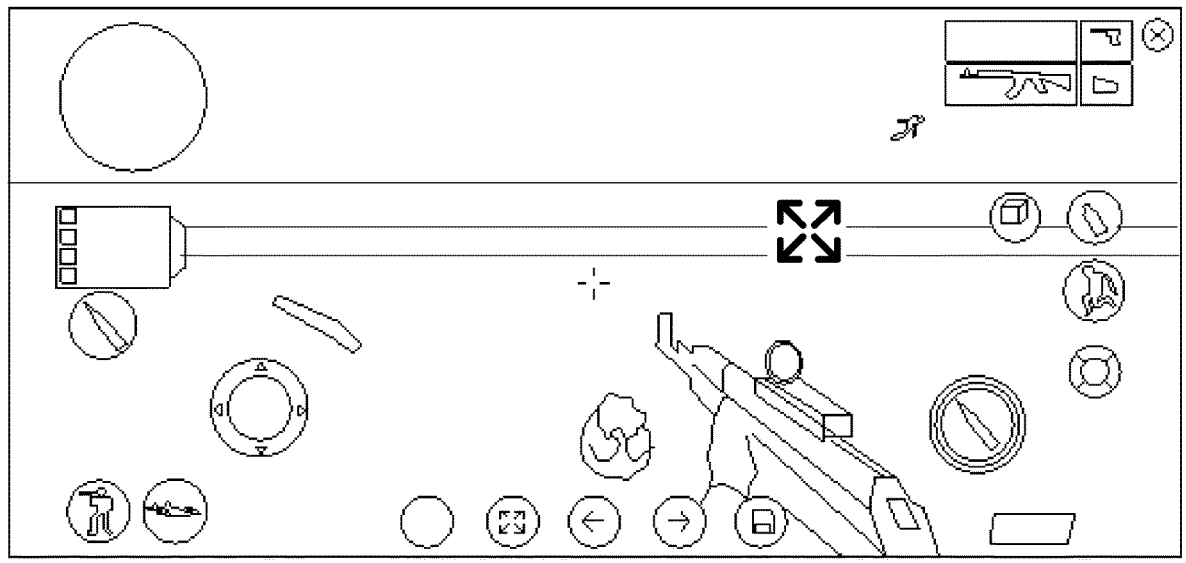
FIG. 8 is a schematic diagram of another item display scene according to an embodiment of the present disclosure.

FIG. 8 is a schematic diagram of another item display scene according to an embodiment of the present disclosure. As shown in FIG. 8, a virtual scene is an FPS virtual scene. In the FPS game scene, the state that the floating frame is closed to display an expansion button of this embodiment may be inherited and remain in other item areas in the virtual scene. For example, when the virtual control object passes through other new item areas, the floating box in other item areas is still closed, and the expansion button (a direction arrow pointing to the four corners shown on the top in FIG. 8) may be displayed. A style of the floating box in each item area may be the same, but information about an item included in the floating box may be different. When the gamer clicks the expansion button of the new item area again, the floating box of the new item area may be triggered to be displayed again in the virtual scene, thereby improving the flexibility of the floating box being displayed in the virtual scene.

The game scenes and the game products applied to the item display method in a virtual scene in the embodiments shown in FIG. 6 to FIG. 8 are merely examples of this embodiment of the present disclosure, which does not indicate that the game scenes and the game products applied in this embodiment of the present disclosure are merely limited to the game scenes and game products shown in FIG. 6 to FIG. 8. For example, the game scenes and the game products may be applied to a TPS scene, and may further be applied to other game products such as a client game, a web game, a host game, and the like, which can be applied to a wide range of application scenes.

In this embodiment, during the game, the gamer can conveniently and efficiently observe surrounding items without interfering with observation of the surrounding battle situation by the gamer, thereby resolving the problem that user not being able to select and pick up props conveniently and freely, further greatly improving user experience.

For brief description, the foregoing method embodiments are represented as a series of actions. However, it is to be appreciated by a person skilled in the art that the present disclosure is not limited to the described order of the actions, because some steps may be performed in other orders or simultaneously according to the present disclosure. In addition, it is to be appreciated by a person skilled in the art that the embodiments described in the specification all belong to exemplary embodiments, and the actions and modules are not necessary for the present disclosure.

Through the description of the foregoing implementations, a person skilled in the art may clearly understand that the method according to the foregoing embodiments may be implemented by means of software and a necessary general hardware platform, and may also be implemented by hardware, but in many cases, the former manner is a better implementation. Based on such understanding, the technical solutions of the present disclosure or a part thereof that makes a contribution to the related art may be essentially embodied in a form of a software product. The computer software product is stored in a storage medium (such as a ROM/RAM, a disk, and an optical disk), including several instructions to enable one terminal device (which may be a mobile phone, a computer, a server, a network device, or the like) to perform the methods in the embodiments of the present disclosure.

Figure 9:
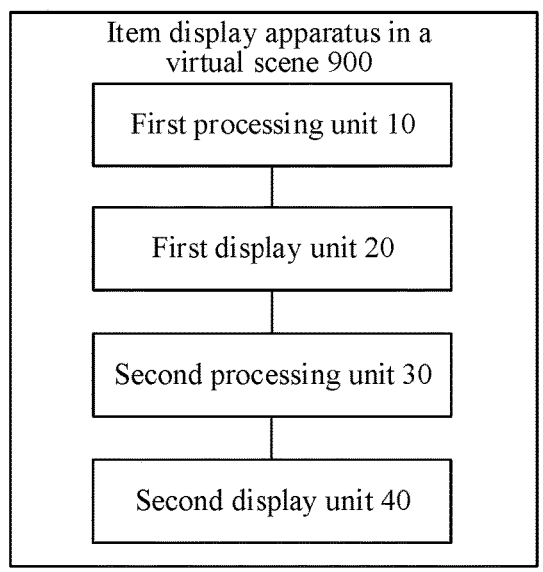
FIG. 9 is a schematic diagram of an item display apparatus in a virtual scene according to an embodiment of the present disclosure.

According to another aspect of the embodiments of the present disclosure, an item display apparatus in a virtual scene for implementing the foregoing item display method in a virtual scene is further provided, including one or more processors and one or more memories storing a program unit, the program unit being executed by the processor and including a first processing unit, a first display unit, a second processing unit, and a second display unit. FIG. 9 is a schematic diagram of an item display apparatus in a virtual scene according to an embodiment of the present disclosure. As shown in FIG. 9, an item display apparatus 900 in the virtual scene may include: a first processing unit 10, a first display unit 20, a second processing unit 30, and a second display unit 40.

The first processing unit 10 is configured to cause a terminal to control, in response to a first target operation instruction generated by a first target operation, movement of a virtual control object in a virtual scene displayed by a client.

The first display unit 20 is configured to cause the terminal to display a first target window in the virtual scene if a distance between the virtual control object and the at least one first virtual item that can be picked up meets a target condition, the first target window being configured to display at least one identifier each associated with one of the at least one first virtual item.

The second processing unit 30 is configured to cause the terminal to close, in response to a second target operation instruction generated by a second target operation, the first target window in the virtual scene, and display a first target button in the virtual scene.

The second display unit 40 is configured to cause the terminal to display a second target button in the virtual scene if a distance between the virtual control object and at least one second virtual item that can be picked up meets the target condition.

The first processing unit 10 in this embodiment may be configured to perform step S202 in the embodiments of this application, the first display unit 20 in this embodiment may be configured to perform step S204 in the embodiments of this application, the second processing unit 30 in this embodiment may be configured to perform step S206 in the embodiments of this application, and the second display unit 40 in this embodiment may be configured to perform step S208 in the embodiments of this application.

The first processing unit 10, the first display unit 20, the second processing unit 30, and the second display unit 40 may be run in the terminal as a part of the apparatus, and functions implemented by the foregoing units may be executed by using the processor in the terminal. The terminal may also be a terminal device such as a smart phone (such as an Android phone, an iPhone, and the like), a tablet computer, a palm computer, a mobile Internet device (MID), a PAD, and the like.

In this embodiment, the terminal closes the first target window in the virtual scene and displays the first target button in the virtual scene, thereby avoiding a case that the first target window cannot be removed from being displayed. In addition, when the distance between the virtual control object and the at least one second virtual item that can be picked up meets the target condition, the terminal displays the second target button in the virtual scene, so that the state of the target window being closed in the virtual scene is inherited and remains, preventing the target window from occupying the visual field of a gamer in the virtual scene due to other target windows in the virtual scene being displayed immediately after meeting the target condition for triggering display, thereby achieving the technical effect of improving the efficiency of displaying the items, and further resolving the technical problem of low efficiency of displaying the items in the related art.

Figure 10:
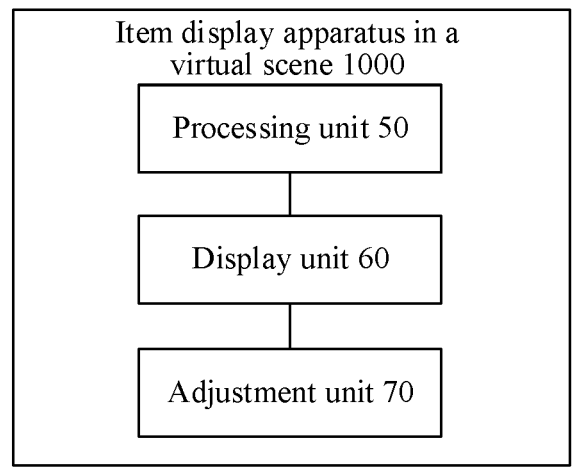
FIG. 10 is a schematic diagram of an item display apparatus in another virtual scene according to an embodiment of the present disclosure.

According to another aspect of the embodiments of the present disclosure, an item display apparatus in a virtual scene for implementing the foregoing item display method in a virtual scene is further provided, including one or more processors and one or more memories storing a program unit, the program unit being executed by the processor and including a processing unit, a display unit, and an adjustment unit. FIG. 10 is a schematic diagram of an item display apparatus in another virtual scene according to an embodiment of the present disclosure. As shown in FIG. 10, an item display apparatus 1000 in the virtual scene may include: a processing unit 50, a display unit 60, and an adjustment unit 70.

The processing unit 50 is configured to cause a terminal to control, in response to a first target operation instruction generated by a first target operation, movement of a virtual control object in a virtual scene displayed by a client.

The display unit 60 is configured to cause the terminal to display a first target window in the virtual scene if a distance between the virtual control object and the at least one first virtual item that can be picked up meets a target condition, the first target window being configured to display at least one identifier each associated with one of the at least one first virtual item.

The adjustment unit 70 is configured to cause the terminal to switch identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

The processing unit 50 in this embodiment may be configured to perform step S302 in the embodiments of this application, the display unit 60 in this embodiment may be configured to perform step S304 in the embodiments of this application, and the adjustment unit 70 in this embodiment may be configured to perform step S306 in the embodiments of this application.

The processing unit 50, the display unit 60, and the adjustment unit 70 may be run in the terminal as a part of the apparatus, and functions implemented by the foregoing units may be executed by using the processor in the terminal. The terminal may also be a terminal device such as a smart phone (such as an Android phone, an iPhone, and the like), a tablet computer, a palm computer, a mobile Internet device (MID), a PAD, and the like.

In this embodiment, the first target operation is used for displaying different item sets in the first target window, so that information about more items can be displayed, thereby improving the technical effect of the efficiency of displaying items is realized, further resolving the technical problem of low efficiency of displaying items in the related art.

The foregoing units are the same as the example and the application scene implemented by the corresponding steps, but are not limited to the content disclosed in the foregoing embodiments. As a part of the apparatus, the foregoing unit may be run in the hardware environment shown in FIG. 1, and may be implemented by software or hardware, where the hardware environment includes a network environment.

According to still another aspect of the embodiments of the present disclosure, an electronic device used for implementing the item display method in a virtual scene is further provided.

Figure 11:
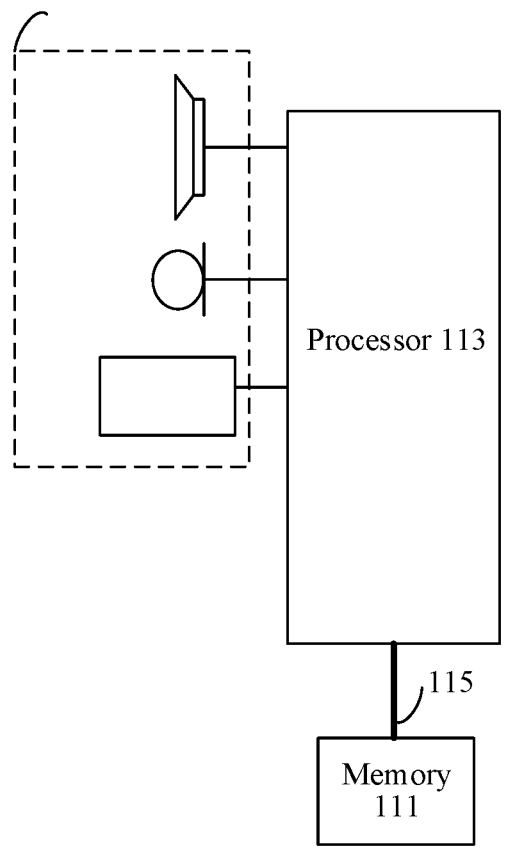
FIG. 11 is a structural block diagram of an electronic device according to an embodiment of the present disclosure.

FIG. 11 is a structural block diagram of an electronic device according to an embodiment of the present disclosure. As shown in FIG. 11, the electronic device may include: a memory 111 and one or more (only one is shown) processors 113, the memory 111 storing a computer program, and the processor 113 may be configured to run the computer program to perform the data processing method of the embodiments of the present disclosure.

The memory 111 may be configured to store a software program and a module, such as a program instruction/module corresponding to the item display method and apparatus in a virtual scene in the embodiments of the present disclosure. The processor 113 executes various functional applications and data processing by running the software program and the module that are stored in the memory 111, to implement the foregoing item display method in a virtual scene. The memory 111 may include a high-speed random access memory, and may further include a non-volatile memory, for example, one or more magnetic storage apparatuses, flash memories, or other non-volatile solid state memories. In some embodiments, the memory 111 may further include memories that are remotely disposed relative to the processor 113, and the remote memories may be connected to a terminal via a network. Examples of the foregoing network include, but are not limited to, an Internet, an intranet, a local area network, a mobile communication network, and a combination thereof.

Optionally, as shown in FIG. 11, the electronic device may further include: a transmission apparatus 115 and an input/output device 117. The transmission apparatus 115 is configured to receive or send data via a network. A specific example of the foregoing network may include a wired network and a wireless network. In an example, the transmission apparatus 115 includes a network interface controller (NIC), and the network interface card may be connected to another network device and a router via a network cable to communicate with the Internet or a local area network. In an example, the transmission apparatus 115 is a radio frequency (RF) module, which is configured to communicate with the Internet in a wireless manner.

Optionally, the memory 111 is configured to store an application program.

The processor 113 may be configured to invoke the computer program stored in the memory 111 by using the transmission apparatus 115 to perform the following operations:

controlling, by a terminal in response to a first target operation instruction generated by a first target operation, movement of a virtual control object in a virtual scene displayed by a client;

displaying, by the terminal, a first target window in the virtual scene if a distance between the virtual control object and the at least one first virtual item that can be picked up meets a target condition, the first target window being configured to display at least one identifier each associated with one of the at least one first virtual item;

closing, by the terminal in response to a second target operation instruction generated by a second target operation, the first target window in the virtual scene, and displaying a first target button in the virtual scene; and displaying, by the terminal, a second target button in the virtual scene if a distance between the virtual control object and the at least one second virtual item that can be picked up meets the target condition.

The processor 113 is further configured to perform the following operations: displaying, by the terminal after displaying the first target button in the virtual scene, the first target window again in the virtual scene if a third target operation performed on the first target button is detected.

The processor 113 is further configured to perform the following operations: displaying, by the terminal after displaying the second target button in the virtual scene, a second target window in the virtual scene if the third target operation performed on the second target button is detected, the second target window being used for displaying at least one identifier each associated with one of the at least one second virtual item.

The processor 113 is further configured to perform the following operations: switching, by the terminal after displaying the first target window in the virtual scene, identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a fourth target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

The processor 113 is further configured to perform the following operations: removing, by the terminal after displaying the first target button in the virtual scene, the first target button from being displayed in the virtual scene if a distance between the virtual control object and the at least one first virtual item that can be picked up does not meet the target condition.

The processor 113 is further configured to perform the following operations: displaying, by the terminal after removing the first target button from being displayed in the virtual scene, the first target button, and skipping displaying the first target window in the virtual scene if the distance between the virtual control object and the at least one first virtual item that can be picked up meets the target condition again.

The processor 113 is further configured to perform the following operations: displaying, by the terminal, the first target window in the virtual scene if a distance between the virtual control object and the at least one first virtual item that can be picked up is less than or equal to a target threshold; and displaying, by the terminal, the second target button in the virtual scene if the distance between the virtual control object and the at least one second virtual item that can be picked up is less than or equal to the target threshold.

The processor 113 is further configured to perform the following operations: controlling, by the terminal in response to the first target operation instruction generated by the first target operation, movement of virtual attack equipment in a virtual scene displayed by a shooting game client, the client including the shooting game client, and the virtual control object including the virtual attack equipment; displaying, by the terminal, the first target window in the virtual scene if a distance between the virtual attack equipment and first virtual attack accessory equipment that can be picked up meets the target condition, the at least one first virtual item including the first virtual attack accessory equipment, and the first target window being configured to display an identifier for each of the first virtual attack accessory equipment; and displaying, by the terminal, the second target button in the virtual scene if a distance between the virtual attack equipment and second virtual attack accessory equipment that can be picked up meets the target condition, the second virtual item including the second virtual attack accessory equipment.

Optionally, in this embodiment, the foregoing processor 113 may be configured to perform the following operations by using the computer program:

controlling, by a terminal in response to a first target operation instruction generated by a first target operation, movement of a virtual control object in a virtual scene displayed by a client;

displaying, by the terminal, a first target window in the virtual scene if a distance between the virtual control object and the at least one first virtual item that can be picked up meets a target condition, the first target window being configured to display at least one identifier each associated with one of the at least one first virtual item; and switching, by the terminal, identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

The processor 113 is further configured to perform the following operations: closing, by the terminal after displaying the first target window in the virtual scene, in response to a second target operation instruction generated by a second target operation, the first target window in the virtual scene, and displaying the first target button in the virtual scene; and displaying, by the terminal, a second target button in the virtual scene if a distance between the virtual control object and at least one second virtual item that can be picked up meets the target condition.

The processor 113 is further configured to perform the following operations: displaying, by the terminal after displaying the first target button in the virtual scene, the first target window again in the virtual scene if a fourth target operation performed on the first target button is detected.

The processor 113 is further configured to perform the following operations: displaying, by the terminal after displaying the second target button in the virtual scene, a second target window in the virtual scene if the fourth target operation performed on the second target button is detected, the second target window being used for displaying an identifier of the second virtual item.

The processor 113 is further configured to perform the following operations: obtaining, by the terminal when displaying the first target window, attribute information of first target items currently being used by the virtual control object; determining, by the terminal according to the attribute information of the first target items, a priority order of candidate target items from the at least one first virtual item according to needs of the virtual control object; and sequentially displaying, by the terminal, in a display area of the first target window, identifiers of the target items included in the at least one first virtual item according to the priority order.

The processor 113 is further configured to perform the following operations: switching, by the terminal, to the identifiers that are of the items in the second item set and that are sequentially displayed according to the priority order, the identifier of the item displayed in the first target window from the identifiers that are of the items in the first item set and that are sequentially displayed according to the priority order.

The processor 113 is further configured to perform the following operations: displaying, by the terminal when switching the identifiers of the items displayed in the first target window from the identifiers of the items in the first item set to the identifiers of the items in the second item set, in a target area of the first target window, an identifier of a target item with the highest priority in a plurality of target items in the at least one first virtual item, where the first item set and the second item set both include the target item with the highest priority.

The processor 113 is further configured to perform the following operations: controlling, by the terminal after determining, according to the attribute information of the first target item, a priority order in which a plurality of target items included in the at least one first virtual item are being used by the virtual control object in the virtual scene, the target item with the highest priority to be added to the virtual container when the target item with the highest priority is not added to the virtual container of the virtual scene within a target time, an item stored in the virtual container being used by the virtual control object in the virtual scene.

The processor 113 is further configured to perform the following operations: adding, by the terminal after displaying the first target window, a second target item to the virtual container of the virtual scene if a fifth target operation performed on an identifier of the second target item in the at least one first virtual item is detected, the item stored in the virtual container being used by the virtual control object in the virtual scene; and deleting, by the terminal, the identifier of the second target item from the first target window, and displaying, in the first target window, an identifier of the third target item in the at least one first virtual item, the identifier of the third target item being an identifier that is of an item in the at least one first virtual item and that is not displayed in the first target window before the identifier of the second target item is deleted.

The processor 113 is further configured to perform the following operations: displaying, by the terminal after displaying the first target window in the virtual scene, target prompt information in the virtual scene if a fifth target operation performed on the identifier of the second target item in the at least one first virtual item is detected, and the virtual container of the virtual scene is completely occupied by stored items, the target prompt information being used for reminding that the virtual container is full, and the items stored in the virtual container being used by the virtual control object in the virtual scene.

The processor 113 is further configured to perform the following operations: displaying, by the terminal, the first target window in the virtual scene if a distance between the virtual control object and the at least one first virtual item that can be picked up is less than or equal to a target threshold; and displaying, by the terminal, the second target button in the virtual scene if the distance between the virtual control object and the at least one second virtual item that can be picked up is less than or equal to the target threshold.

The processor 113 is further configured to perform the following operations: controlling, by the terminal in response to the first target operation instruction generated by the first target operation, movement of virtual attack equipment in a virtual scene displayed by a shooting game client, the client including the shooting game client, and the virtual control object including the virtual attack equipment; displaying, by the terminal, the first target window in the virtual scene if a distance between the virtual attack equipment and first virtual attack accessory equipment that can be picked up meets the target condition, the at least one first virtual item including the first virtual attack accessory equipment, and the first target window being configured to display an identifier for each of the first virtual attack accessory equipment; and switching, by the terminal, identifiers of virtual attack equipment displayed in the first target window from identifiers of virtual attack accessory equipment in a first virtual attack accessory equipment set to identifiers of virtual attack accessory equipment in a second virtual attack accessory equipment set if a quantity of identifiers of the first virtual attack accessory equipment exceeds a total quantity of identifiers that are allowed to be displayed in a display area of the first target window, and the second target operation performed on the first target window is detected, the identifiers of the first virtual attack accessory equipment including the identifiers of the virtual attack accessory equipment in the first virtual attack accessory equipment set and the identifiers of the virtual attack accessory equipment in the second virtual attack accessory equipment set, and the identifiers of the virtual attack accessory equipment in the first virtual attack accessory equipment set and the identifiers of the virtual attack accessory equipment in the second virtual attack accessory equipment set being partially identical or completely different.

According to the embodiments of the present disclosure, an item display method in a virtual scene is provided. The first target window is closed in the virtual scene, and the first target button is displayed in the virtual scene, thereby avoiding a case that the first target window cannot be removed from being displayed. When the distance between the virtual control object and the at least one second virtual item that can be picked up meets the target condition, the terminal displays the second target button in the virtual scene, so that the state in which the target window is closed in the virtual scene remains, preventing the target window from occupying the visual field of a gamer in the virtual scene as a result of other target windows in the virtual scene being displayed immediately after meeting the target condition for triggering display, thereby achieving the technical effect of improving the efficiency of displaying the items, and further resolving the technical problem of low efficiency of displaying the items in the related art.

Optionally, for a specific example in this embodiment, reference may be made to the example described in the foregoing embodiment, and details are not described herein again in this embodiment.

Optionally, a person skilled in the art may understand that the electronic device shown in FIG. 11 is merely an example, and the electronic device may also be a terminal device such as a smart phone (such as an Android mobile phone, an iPhone, or the like), a tablet computer, a palmtop computer, a mobile Internet device (MID), a PAD, or the like. FIG. 11 does not constitute a limitation on the structure of the foregoing electronic device. For example, the electronic device may further include more or few components (such as a network interface, a display apparatus, or the like) than those shown in FIG. 11, or has a configuration different from that shown in FIG. 11.

The embodiments of the present disclosure further provide a storage medium. Optionally, in this embodiment, the storage medium stores a computer program, the computer program, when being run, being configured to perform the step in the foregoing any one of the method embodiments.

Optionally, in this embodiment, the storage medium may be located on at least one of a plurality of network devices in the network described in the foregoing embodiment.

Optionally, in this embodiment, the storage medium is configured to store program code for performing the following steps:

controlling, by a terminal in response to a first target operation instruction generated by a first target operation, movement of a virtual control object in a virtual scene displayed by a client;

displaying, by the terminal, a first target window in the virtual scene if a distance between the virtual control object and the at least one first virtual item that can be picked up meets a target condition, the first target window being configured to display at least one identifier each associated with one of the at least one first virtual item;

closing, by the terminal in response to a second target operation instruction generated by a second target operation, the first target window in the virtual scene, and displaying a first target button in the virtual scene; and displaying, by the terminal, a second target button in the virtual scene if a distance between the virtual control object and the at least one second virtual item that can be picked up meets the target condition.

Optionally, the storage medium is further configured to store program code for performing the following step: displaying, by the terminal after displaying the first target button in the virtual scene, the first target window again in the virtual scene if a third target operation performed on the first target button is detected.

Optionally, the storage medium is further configured to store program code for performing the following step: displaying, by the terminal after displaying the second target button in the virtual scene, a second target window in the virtual scene if the third target operation performed on the second target button is detected, the second target window being used for displaying identifiers of the second virtual items.

Optionally, the storage medium is further configured to store program code for performing the following step: switching, by the terminal after displaying the first target window in the virtual scene, identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a fourth target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

Optionally, the storage medium is further configured to store program code for performing the following step:

removing, by the terminal after displaying the first target button in the virtual scene, the first target button from being displayed in the virtual scene if a distance between the virtual control object and the at least one first virtual item that can be picked up does not meet the target condition.

Optionally, the storage medium is further configured to store program code for performing the following step: displaying, by the terminal after removing the first target button from being displayed in the virtual scene, the first target button, and skipping displaying the first target window in the virtual scene if the distance between the virtual control object and the at least one first virtual item that can be picked up meets the target condition again.

Optionally, the storage medium is further configured to store program code for performing the following steps: displaying, by the terminal, the first target window in the virtual scene if a distance between the virtual control object and the at least one first virtual item that can be picked up is less than or equal to a target threshold; and displaying, by the terminal, the second target button in the virtual scene if the distance between the virtual control object and the at least one second virtual item that can be picked up is less than or equal to the target threshold.

Optionally, the storage medium is further configured to store program code for performing the following steps: controlling, by the terminal in response to the first target operation instruction generated by the first target operation, movement of virtual attack equipment in a virtual scene displayed by a shooting game client, the client including the shooting game client, and the virtual control object including the virtual attack equipment; displaying, by the terminal, the first target window in the virtual scene if a distance between the virtual attack equipment and first virtual attack accessory equipment that can be picked up meets the target condition, the at least one first virtual item including the first virtual attack accessory equipment, and the first target window being configured to display an identifier for each of the first virtual attack accessory equipment; and displaying, by the terminal, the second target button in the virtual scene if a distance between the virtual attack equipment and second virtual attack accessory equipment that can be picked up meets the target condition, the second virtual item including the second virtual attack accessory equipment.

Optionally, in this embodiment, the storage medium is further configured to store program code for performing the following steps:

controlling, by a terminal in response to a first target operation instruction generated by a first target operation, movement of a virtual control object in a virtual scene displayed by a client;

displaying, by the terminal, a first target window in the virtual scene if a distance between the virtual control object and the at least one first virtual item that can be picked up meets a target condition, the first target window being configured to display at least one identifier each associated with one of the at least one first virtual item; and switching, by the terminal, identifiers of items displayed in the first target window from identifiers of items in a first item set to identifiers of items in a second item set if a quantity of identifiers of the at least one first virtual item exceeds a total quantity of identifiers that are allowed to be displayed in a display area of the first target window, and a second target operation performed on the first target window is detected, the identifiers of the at least one first virtual item including the identifiers of the items in the first item set and the identifiers of the items in the second item set, and the identifiers of the items in the first item set and the identifiers of the items in the second item set being partially identical or completely different.

Optionally, the storage medium is further configured to store program code for performing the following steps: closing, by the terminal after displaying the first target window in the virtual scene, in response to a second target operation instruction generated by a second target operation, the first target window in the virtual scene, and displaying the first target button in the virtual scene; and displaying, by the terminal, a second target button in the virtual scene if a distance between the virtual control object and the at least one second virtual item that can be picked up meets the target condition.

Optionally, the storage medium is further configured to store program code for performing the following step: displaying, by the terminal after displaying the first target button in the virtual scene, the first target window again in the virtual scene if a fourth target operation performed on the first target button is detected.

Optionally, the storage medium is further configured to store program code for performing the following step: displaying, by the terminal after displaying the second target button in the virtual scene, a second target window in the virtual scene if the fourth target operation performed on the second target button is detected, the second target window being used for displaying an identifier of the second virtual item.

Optionally, the storage medium is further configured to store program code for performing the following steps: obtaining, by the terminal when displaying the first target window, attribute information of a first target item currently being used by the virtual control object; determining, by the terminal according to the attribute information of the first target item, a priority order in which a plurality of target items included in the at least one first virtual item are being used by the virtual control object in the virtual scene, respectively; and sequentially displaying, by the terminal, in a display area of the first target window, identifiers of items in the first item set in the plurality of target items according to the priority order.

Optionally, the storage medium is further configured to store program code for performing the following step: switching, by the terminal, the identifiers displayed in the first target window from the identifiers of the items in the first item set to the identifiers of the items in the second item set that are sequentially displayed according to the priority order.

Optionally, the storage medium is further configured to store program code for performing the following step: displaying, by the terminal when switching the identifier of the item displayed in the first target window from the identifiers of the items in the first item set to the identifiers of the items in the second item set, in a target area of the first target window, an identifier of a target item with the highest priority in a plurality of target items in the at least one first virtual item, where the first item set and the second item set both include the target item with the highest priority.

Optionally, the storage medium is further configured to store program code for performing the following step: controlling, by the terminal after determining, according to the attribute information of the first target item, a priority order of target items included in the at least one first virtual item, if assuming the target items are being used by the virtual control object, the target item with the highest priority to be added to the virtual container when the target item with the highest priority is not added to the virtual container of the virtual scene within a target period of time, an item stored in the virtual container being used by the virtual control object in the virtual scene.

Optionally, the storage medium is further configured to store program code for performing the following steps: adding, by the terminal after displaying the first target window, a second target item to the virtual container of the virtual scene if a fifth target operation performed on an identifier of the second target item in the at least one first virtual item is detected, the item stored in the virtual container being used by the virtual control object in the virtual scene; and deleting, by the terminal, the identifier of the second target item from the first target window, and displaying, in the first target window, an identifier of the third target item in the at least one first virtual item, the identifier of the third target item being an identifier that is of an item in the at least one first virtual item and that is not displayed in the first target window before the identifier of the second target item is deleted.

Optionally, the storage medium is further configured to store program code for performing the following step: displaying, by the terminal after displaying the first target window in the virtual scene, target prompt information in the virtual scene if a fifth target operation performed on the identifier of the second target item in the at least one first virtual item is detected, and the virtual container of the virtual scene is completely occupied by stored items, the target prompt information being used for reminding that the virtual container is full, and the items stored in the virtual container being used by the virtual control object in the virtual scene.

Optionally, the storage medium is further configured to store program code for performing the following steps: displaying, by the terminal, the first target window in the virtual scene if a distance between the virtual control object and the at least one first virtual item that can be picked up is less than or equal to a target threshold; and displaying, by the terminal, the second target button in the virtual scene if the distance between the virtual control object and the at least one second virtual item that can be picked up is less than or equal to the target threshold.

Optionally, the storage medium is further configured to store program code for performing the following steps: controlling, by the terminal in response to the first target operation instruction generated by the first target operation, movement of virtual attack equipment in a virtual scene displayed by a shooting game client, the client including the shooting game client, and the virtual control object including the virtual attack equipment; displaying, by the terminal, the first target window in the virtual scene if a distance between the virtual attack equipment and first virtual attack accessory equipment that can be picked up meets the target condition, the at least one first virtual item including the first virtual attack accessory equipment, and the first target window being configured to display an identifier for each of the first virtual attack accessory equipment; and switching an identifier of virtual attack equipment displayed in the first target window from identifiers of virtual attack accessory equipment in a first virtual attack accessory equipment set to an identifiers of virtual attack accessory equipment in a second virtual attack accessory equipment set if a quantity of identifiers of the first virtual attack accessory equipment exceeds a total quantity of identifiers that are allowed to be displayed in a display area of the first target window, and the second target operation performed on the first target window is detected, the identifiers of the first virtual attack accessory equipment including the identifier of the virtual attack accessory equipment in the first virtual attack accessory equipment set and the identifier of the virtual attack accessory equipment in the second virtual attack accessory equipment set, and the identifier of the virtual attack accessory equipment in the first virtual attack accessory equipment set and the identifier of the virtual attack accessory equipment in the second virtual attack accessory equipment set being partially identical or completely different.

Optionally, for a specific example in this embodiment, reference may be made to the example described in the foregoing embodiment, and details are not described herein again in this embodiment.

Optionally, in this embodiment, the foregoing storage medium may include but is not limited to: any medium that can store program code, such as a USB flash disk, a read-only memory (ROM), a random access memory (RAM), a mobile hard disk, a magnetic disk, an optical disk, or the like.

The item display method and apparatus in the virtual scene, and the storage medium according to the embodiments of the present disclosure are described by using examples with reference to the accompanying drawings. However, a person skilled in the art is to understand that, for the item display method and apparatus, and the storage medium in the virtual scene provided in the foregoing embodiments of the present disclosure, various improvements may further be made without departing from the content of the present disclosure. Therefore, the protection scope of the embodiments of the present disclosure is to be determined by contents of the appended claims.

The sequence numbers of the embodiments of the present disclosure are merely for the convenience of description, and do not imply the preference among the embodiments.

When the integrated unit in the foregoing embodiment is implemented in the form of a software functional unit and sold or used as an independent product, the integrated unit may be stored in the foregoing computer-readable storage medium. Based on such an understanding, the technical solutions of the present disclosure essentially, or the part contributing to the related art, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present disclosure.

In the foregoing embodiments of the present disclosure, the descriptions of the embodiments have respective focuses. For the part that is not detailed in an embodiment, refer to the relevant description of other embodiments.

In the several embodiments provided in this application, it is understood that the disclosed client may be implemented in other manners. For example, the described apparatus embodiment is merely an example. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

The foregoing descriptions are merely exemplary implementations of the present disclosure. A person of ordinary skill in the art may make several improvements or polishing without departing from the principle of the present disclosure, and the improvements or polishing shall fall within the protection scope of the present disclosure.

INDUSTRIAL APPLICABILITY

In the embodiments of the present disclosure, the method includes: controlling, by a terminal in response to a first target operation instruction generated by a first target operation, movement of a virtual control object in a virtual scene displayed by a client; displaying, by the terminal, a first target window in the virtual scene if a distance between the virtual control object and the at least one first virtual item that can be picked up meets a target condition, the first target window being configured to display at least one identifier each associated with one of the at least one first virtual item; and closing, by the terminal in response to a second target operation instruction generated by a second target operation, the first target window in the virtual scene, and displaying a first target button in the virtual scene; and displaying, by the terminal, a second target button in the virtual scene if a distance between the virtual control object and the at least one second virtual item that can be picked up meets the target condition. The first target window is closed in the virtual scene, and the first target button is displayed in the virtual scene, thereby avoiding a case that the first target window cannot be removed from being displayed. When the distance between the virtual control object and the at least one second virtual item that can be picked up meets the target condition, the terminal displays the second target button in the virtual scene, so that the state of the target window being closed in the virtual scene is inherited and remains, preventing the subsequent target window from occupying the visual field of a gamer in the virtual scene as a result of other target windows in the virtual scene being displayed immediately after meeting the target condition, thereby achieving the technical effect of improving the efficiency of displaying the items, and further resolving the technical problem of low efficiency of displaying the items in the related art.

What is claimed is:

1. A virtual item display method in a virtual scene, the method comprising:
controlling, by a terminal in response to a first target operation instruction generated by a first target operation, movement of a virtual control object in a virtual scene displayed by a client;
displaying, by the terminal, a first target window in the virtual scene if a distance between the virtual control object and at least one first virtual item that can be picked up meets a target condition, the first target window being configured to display at least one identifier each associated with one of the at least one first virtual item;

closing, by the terminal in response to a second target operation instruction generated by a second target operation, the first target window in the virtual scene, and displaying a first target button in the virtual scene; and displaying, by the terminal, a second target button in the virtual scene if a distance between the virtual control object and at least one second virtual item that can be picked up meets the target condition.

2. The method according to claim 1, wherein after displaying, by the terminal, the first target button in the virtual scene, the method further comprises:

displaying, by the terminal, the first target window again in the virtual scene if a third target operation performed on the first target button is detected.

3. The method according to claim 1, wherein after displaying, by the terminal, the second target button in the virtual scene, the method further comprises:

displaying, by the terminal, a second target window in the virtual scene if a third target operation performed on the second target button is detected, the second target window being configured to display at least one identifier each associated with one of the at least one second virtual item.

4. The method according to claim 1, wherein the at least one identifier corresponds to a first set of virtual items of the at least one first virtual items, wherein after displaying, by the terminal, the first target window in the virtual scene, the method further comprises:

switching, by the terminal, from the at least one identifier corresponding to the first set of virtual items displayed in the first target window to identifiers corresponding to a second set of virtual items of the at least one first virtual items when a total quantity of the at least one first virtual item exceeds a total quantity of identifiers that are allowed to be displayed in a display area of the first target window, and when a fourth target operation performed on the first target window is detected, the first and second set of virtual items being partially identical or completely different.

5. The method according to claim 1, wherein after displaying, by the terminal, the first target button in the virtual scene, the method further comprises:

removing, by the terminal, the first target button from being displayed in the virtual scene if a distance between the virtual control object and the at least one first virtual item that can be picked up does not meet the target condition.

6. The method according to claim 5, wherein after removing, by the terminal, the first target button in the virtual scene, the method further comprises:

displaying, by the terminal, the first target button, and skipping displaying the first target window in the virtual scene if the distance between the virtual control object and the at least one first virtual item that can be picked up meets the target condition again.

7. The method according to claim 1, wherein a display area of the first target button in the virtual scene is less than a display area of the first target window in the virtual scene.

8. The method according claim 1, wherein:

displaying, by the terminal, the first target window in the virtual scene comprises: displaying, by the terminal, the first target window in the virtual scene if the distance between the virtual control object and the at least one first virtual item that can be picked up is less than or equal to a target threshold; and displaying, by the terminal, a second target button in the virtual scene comprises: displaying, by the terminal, the second target button in the virtual scene if the distance between the virtual control object and the at least one second virtual item that can be picked up is less than or equal to the target threshold.

9. The method according to claim 1, wherein:

the client comprises a shooting game client, and the virtual control object comprises a virtual attack equipment;

displaying, by the terminal, the first target window in the virtual scene comprises: displaying, by the terminal, the first target window in the virtual scene if a distance between the virtual attack equipment and first virtual attack accessory equipment that can be picked up meets the target condition, the at least one first virtual item comprising the first virtual attack accessory equipment, and the first target window being configured to display an identifier for each of the first virtual attack accessory equipment; and the displaying, by the terminal, a second target button comprises: displaying, by the terminal, the second target button in the virtual scene if a distance between the virtual attack equipment and second virtual attack accessory equipment that can be picked up meets the target condition, the second virtual item comprising the second virtual attack accessory equipment.

10. A virtual item display method in a virtual scene, the method comprising:

controlling, by a terminal in response to a first target operation instruction generated by a first target operation, movement of a virtual control object in a virtual scene displayed by a client;

displaying, by the terminal, a first target window in the virtual scene if a distance between the virtual control object and at least one first virtual item that can be picked up meets a target condition, the first target window being configured to display at least one identifier each associated with one of the at least one first virtual item; and switching, by the terminal, identifiers of items displayed in the first target window from identifiers of virtual items in a first virtual item set to identifiers of virtual items in a second virtual item set if a quantity of identifiers of the at least one first virtual item exceeds a total quantity of identifiers that are allowed to be displayed in a display area of the first target window, and a second target operation performed on the first target window is detected, the identifiers of the at least one first virtual item comprising the identifiers of the virtual items in the first virtual item set and the identifiers of the virtual items in the second virtual item set, and the identifiers of the virtual items in the first virtual item set and the identifiers of the virtual items in the second virtual item set being partially identical or completely different.

11. The method according to claim 10, wherein after the displaying, by the terminal, the first target window in the virtual scene, the method further comprises:

closing, by the terminal in response to a second target operation instruction generated by a third target operation, the first target window in the virtual scene, and displaying a first target button in the virtual scene; and displaying, by the terminal, a second target button in the virtual scene if a distance between the virtual control object and at least one second virtual item that can be picked up meets the target condition.

12. The method according to claim 11, wherein after displaying, by the terminal, the first target button in the virtual scene, the method further comprises:
  displaying, by the terminal, the first target window again in the virtual scene if a fourth target operation performed on the first target button is detected.

13. The method according to claim 11, wherein after displaying, by the terminal, the second target button in the virtual scene, the method further comprises:
  displaying, by the terminal, a second target window in the virtual scene if a fourth target operation performed on the second target button is detected, the second target window being configured to display at least one identifier each associated with one of the at least one second virtual item.

14. The method according to claim 10, wherein during the displaying, by the terminal, the first target window in the virtual scene, the method further comprises:
  obtaining, by the terminal, attribute information of first target virtual items currently being used by the virtual control object;
  determining, by the terminal according to the attribute information of the first target items, a priority order of candidate target virtual items from the at least one first virtual item according to needs of the virtual control object; and
  sequentially displaying, by the terminal, in a display area of the first target window, the identifiers of the candidate target virtual items according to the priority order.

15. The method according to claim 14, wherein the switching, by the terminal, identifiers of items displayed in the first target window comprises:
  switching, by the terminal, the identifier of the virtual item displayed in the first target window from the identifiers of the virtual items in the first virtual item set sequentially displayed according to the priority order to the identifiers of the virtual items in the second virtual item set sequentially displayed according to the priority order.

16. The method according to claim 14, wherein during the switching, by the terminal, identifiers of items displayed in the first target window from identifiers of virtual items in the first virtual item set to identifiers of virtual items in the second virtual item set, the method further comprises:
  displaying, by the terminal, in a target area of the first target window, an identifier of a preferred target virtual item with the highest priority in target virtual items, the first item set and the second virtual item set both comprising the preferred target virtual item with the highest priority.

17. The method according to claim 16, wherein after determining, by the terminal according to the attribute information of the first target virtual items, the method further comprises:
  controlling, by the terminal, a target virtual item with the highest priority to be added to a virtual container if the target virtual item with the highest priority is not added to the virtual container of the virtual scene within a target time, an virtual item stored in the virtual container being used by the virtual control object in the virtual scene.

18. The method according to claim 17, wherein after the displaying, by the terminal, the first target window in the virtual scene, the method further comprises:
  adding, by the terminal, a second target virtual item to the virtual container of the virtual scene if a fifth target operation performed on an identifier of the second target virtual item in the at least one first virtual item is detected, the virtual item stored in the virtual container being used by the virtual control object in the virtual scene; and
  deleting, by the terminal, the identifier of the second target virtual item from the first target window, and displaying, in the first target window, an identifier of a third target virtual item in the at least one first virtual item, the identifier of the third target virtual item is not displayed in the first target window before the identifier of the second target virtual item is deleted.

19. The method according to claim 17, wherein after the displaying, by the terminal, the first target window in the virtual scene, the method further comprises:
  displaying, by the terminal, target prompt information in the virtual scene if a fifth target operation performed on the identifier of the second target virtual item in the at least one first virtual item is detected, and the virtual container of the virtual scene is completely occupied by stored virtual items, the target prompt information being used for reminding that the virtual container is full, and the virtual items stored in the virtual container being used by the virtual control object in the virtual scene.

20. An apparatus for item display in a virtual scene, comprising a memory for storing computer readable instructions and a processor in communication with the memory, wherein the processor is configured to execute the computer readable instructions to cause the apparatus to:
  control, in response to a first target operation instruction generated by a first target operation, movement of a virtual control object in a virtual scene displayed by a client;
  display a first target window in the virtual scene if a distance between the virtual control object and at least one first virtual item that can be picked up meets a target condition, the first target window being configured to display at least one identifier each associated with one of the at least one first virtual item;
  close, in response to a second target operation instruction generated by a second target operation, the first target window in the virtual scene, and display a first target button in the virtual scene; and
  display a second target button in the virtual scene if a distance between the virtual control object and at least one second virtual item that can be picked up meets the target condition.

* * * * *